Jan. 25, 1944.  L. M. POTTS  2,339,803
RECORDING AND AUDITING SYSTEM
Filed Jan. 2, 1941  7 Sheets-Sheet 5

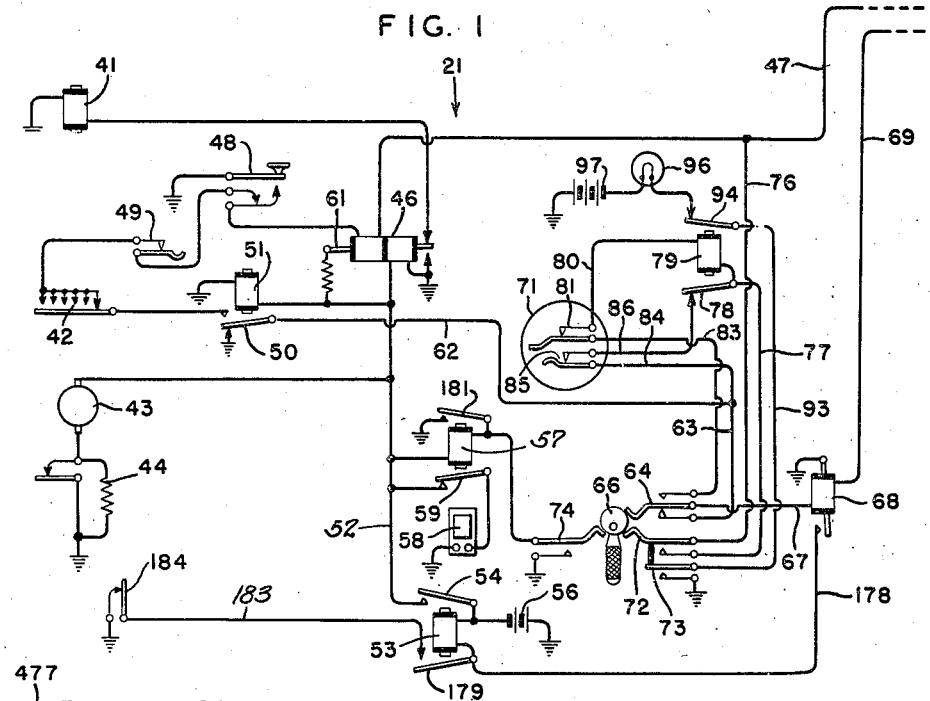
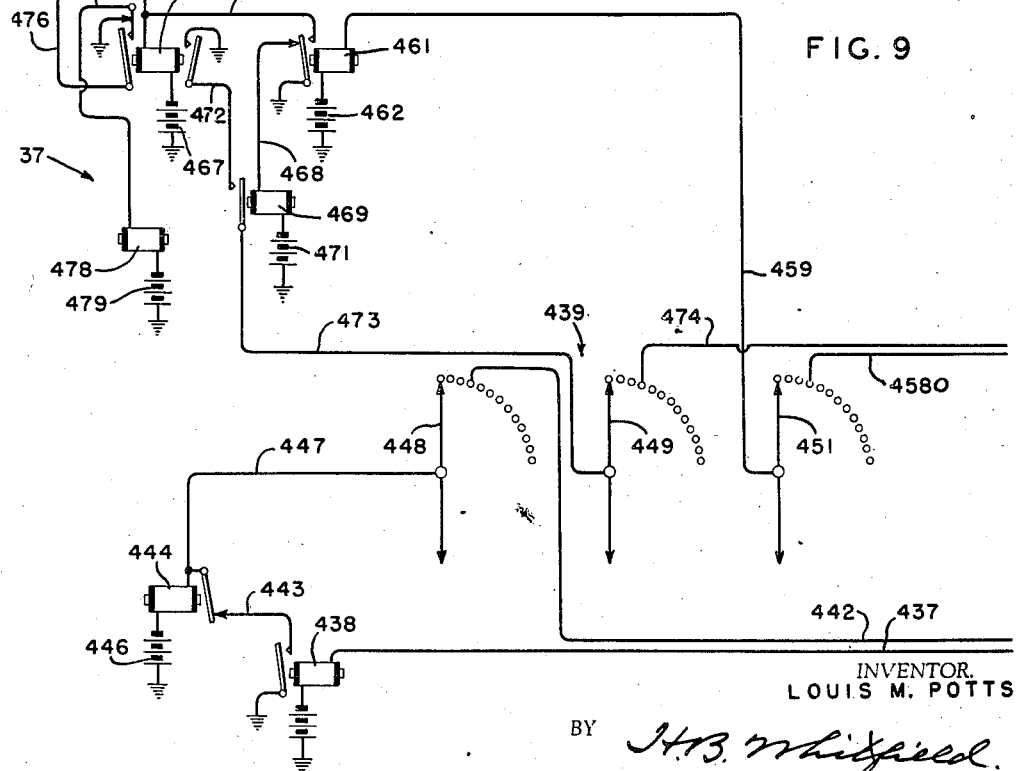

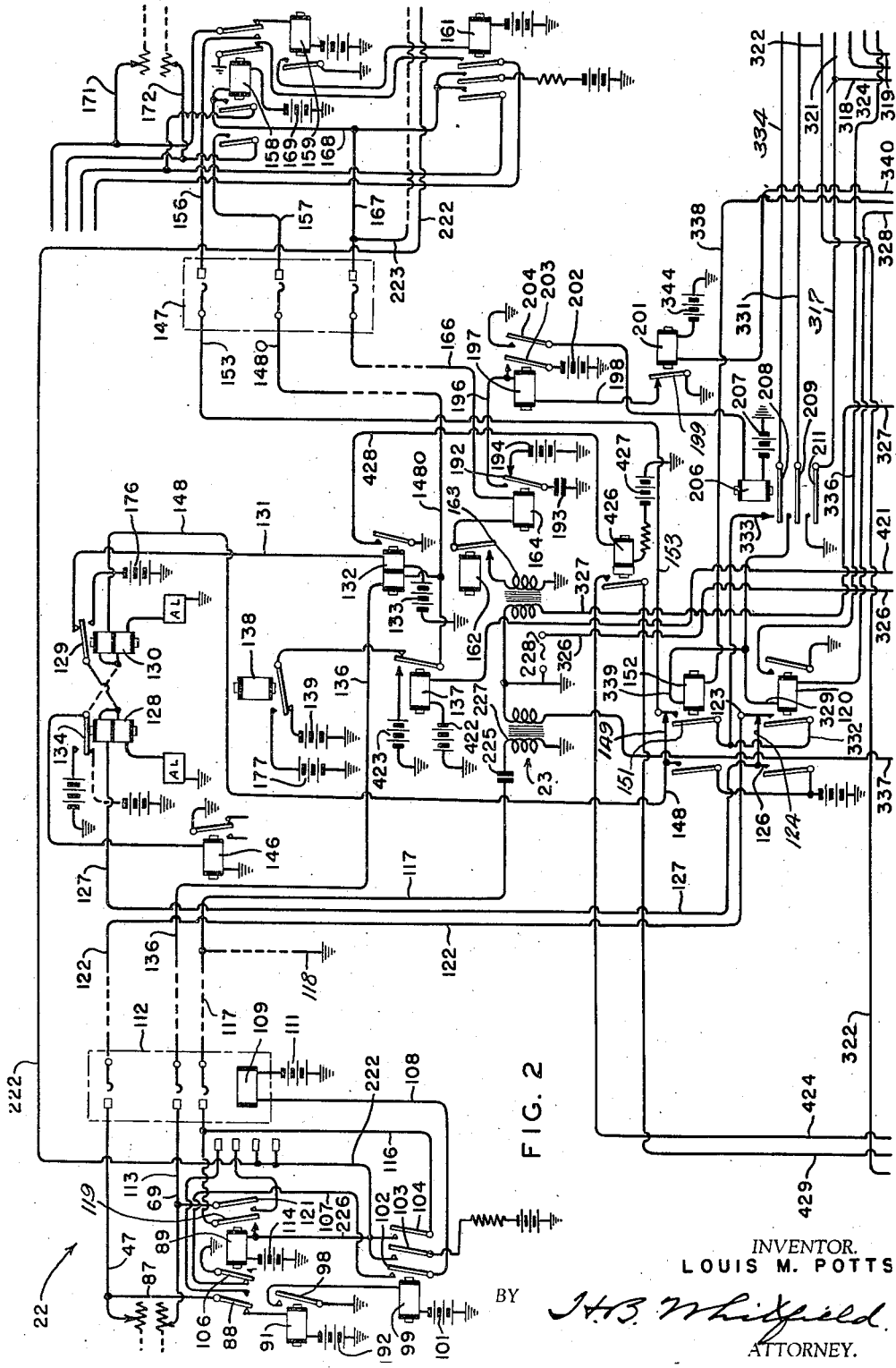

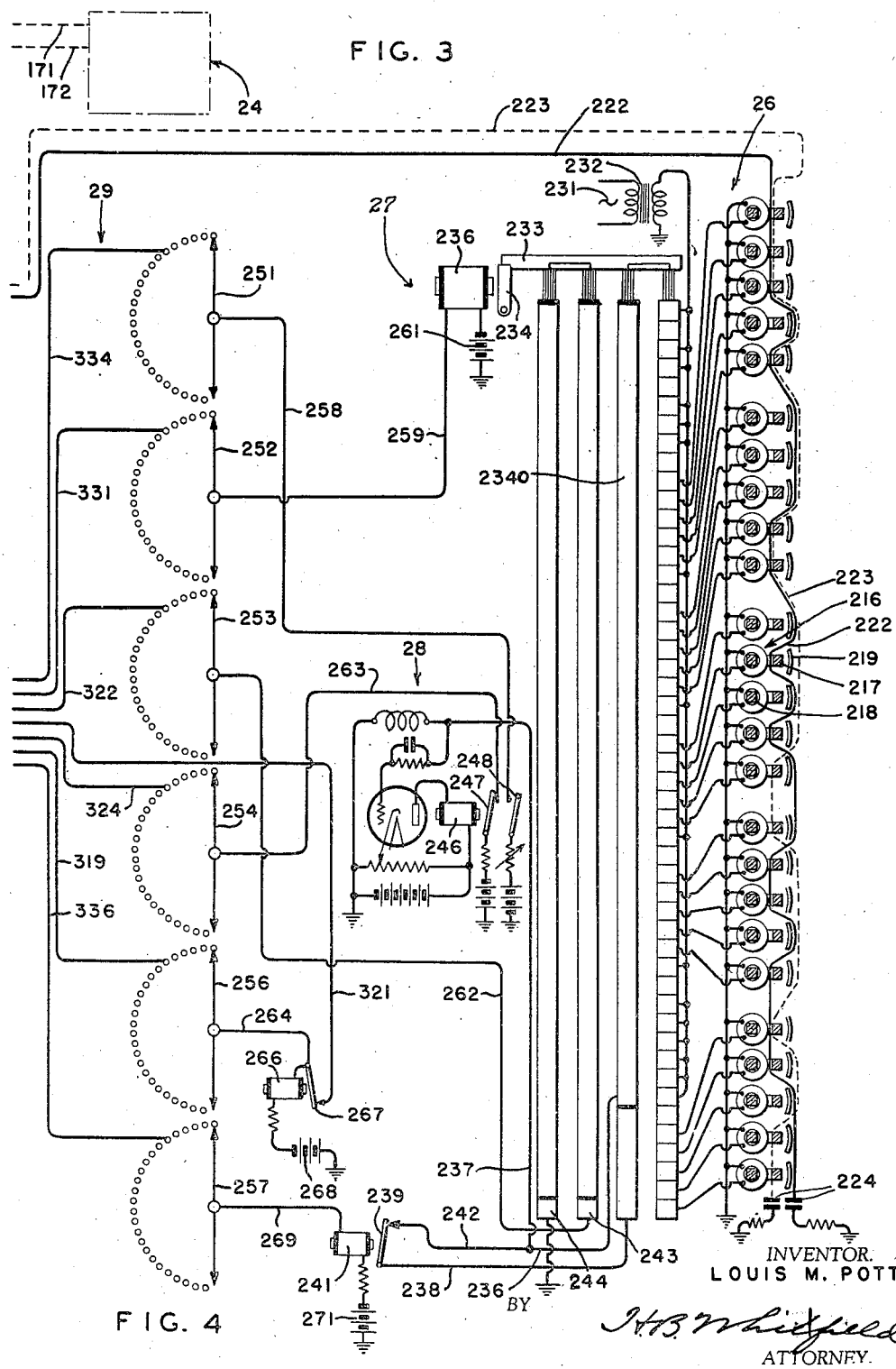

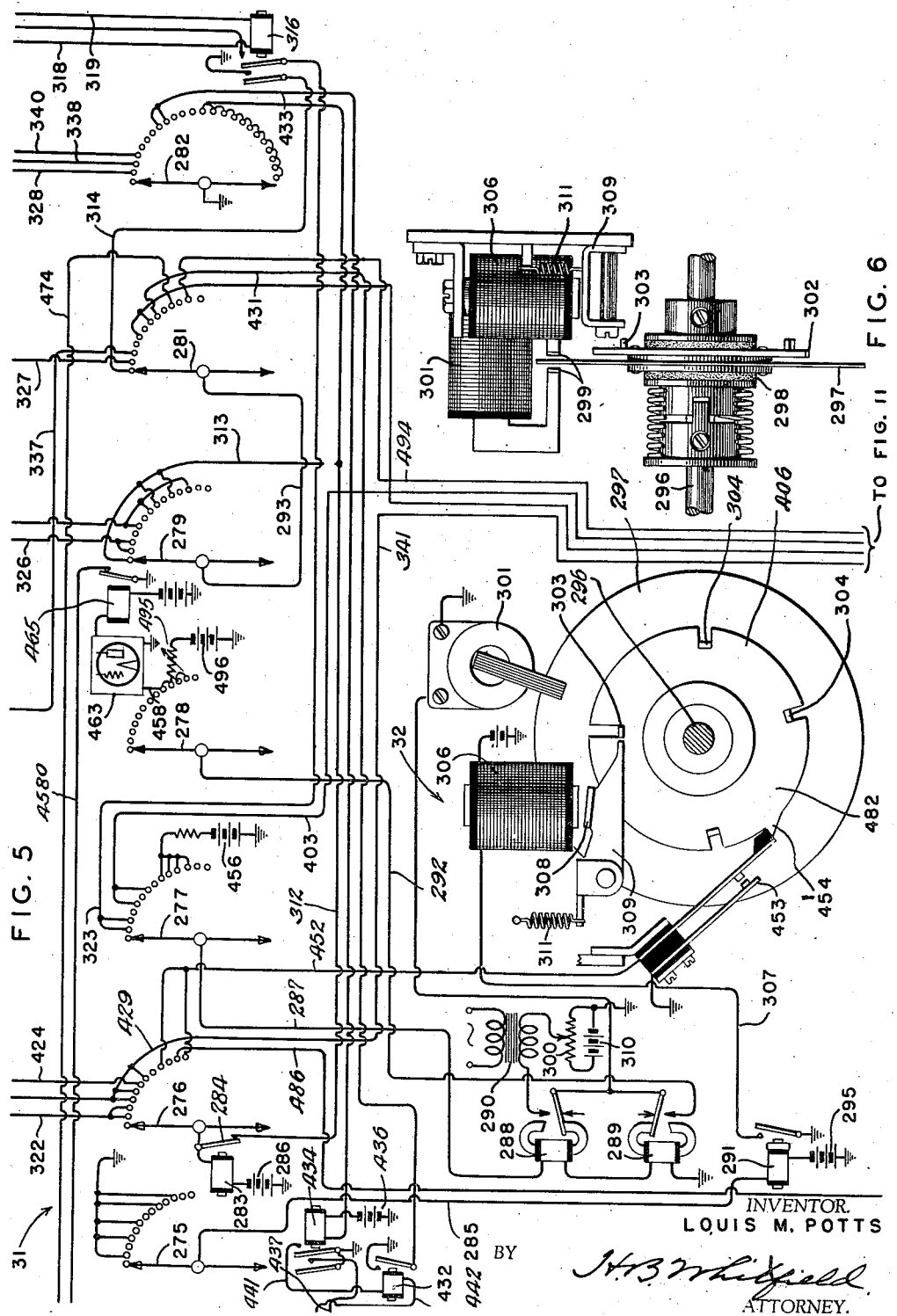

INVENTOR.
LOUIS M. POTTS
BY
ATTORNEY.

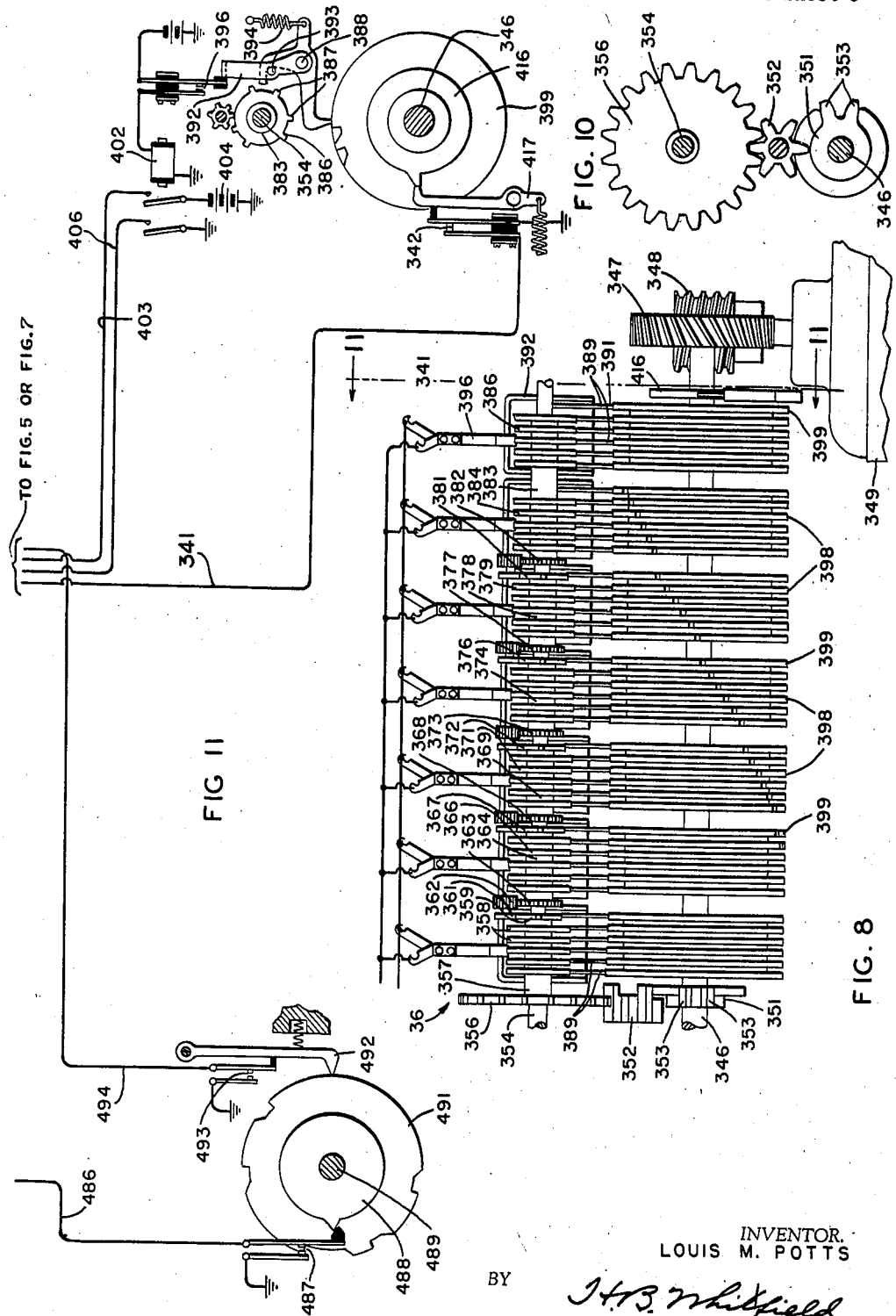

Jan. 25, 1944. L. M. POTTS 2,339,803
RECORDING AND AUDITING SYSTEM
Filed Jan. 2, 1941 7 Sheets-Sheet 7
FIG. 13
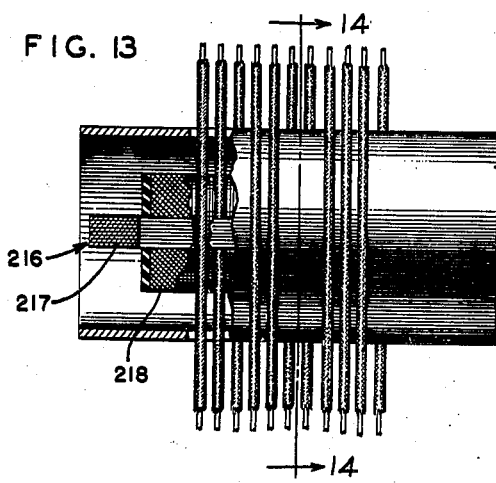
FIG. 14
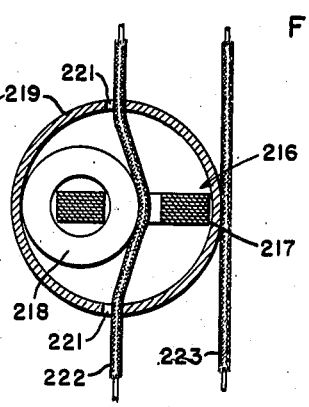
FIG. 15
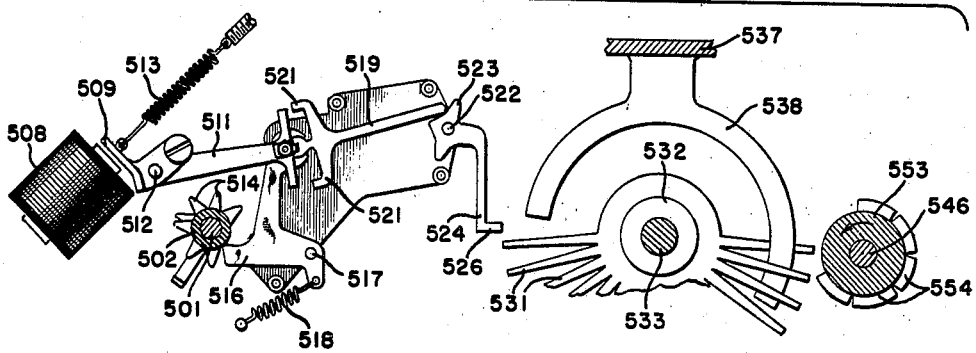
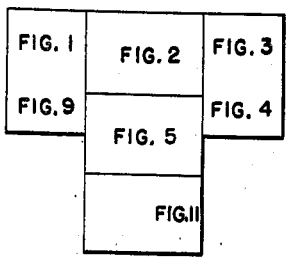
FIG. 16
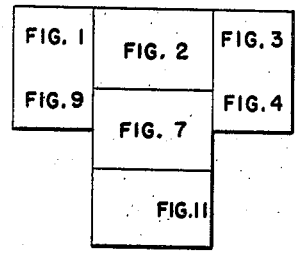
FIG. 12
INVENTOR.
LOUIS M. POTTS
BY
ATTORNEY.

Patented Jan. 25, 1944

2,339,803

UNITED STATES PATENT OFFICE 2,339,803

RECORDING AND AUDITING SYSTEM

Louis M. Potts, Evanston, Ill., assignor to Teletype Corporation, Chicago, Ill., a corporation of Delaware Application January 2, 1941, Serial No. 372,717

23 Claims. (Cl. 178—2)

This invention relates generally to switching systems and particularly to systems for telephone and telegraph service in which an accounting record is desired of each communicative connection.

In the operation of manual switching exchanges in which an accounting record of each communicative connection is made and in which there is no provision of apparatus for producing such a record automatically, an operator ordinarily makes a written record manually of each such connection. In the operation of exchanges provided with automatic switching means for completing communicative connections, manual recording of the accounting information is disadvantageous.

Accordingly, an object of the invention is to make automatically a record of communicative connections individually, the record being of such nature that from it a bill for the communication service may be rendered.

Essential data for the compilation of a bill for communication service includes the identity of both of the connected stations and the elapsed time of communication.

It is, therefore, another object of this invention to provide an automatic line identifying device which will identify a calling station and the called station to which the calling station becomes connected, by generating signals corresponding to the symbols by which the identities of the two stations are designated.

It is another object of the invention to provide a time controlled generator of signals which at any time is prepared to furnish signals representing instant time and which may be called upon at the establishment of a communicative connection to furnish signals representing the time of such establishment of the connection, and which may be called upon at the conclusion of communication to furnish signals representing the time of such conclusion.

The invention features registers for storing signals constituting the information to be recorded for accounting purposes and for transmitting the signals to a recorder after the conclusion of message transmission, there being at least as many registers as the number of communicative interconnections that may exist concurrently, a register being seized for use upon the setting up of a communicative interconnection and being held associated therewith until the signals representing the final data relating to the communicative connection have been stored.

The invention also features registers of two different types, one providing for the mechanical storage of code signals, and the other providing for the magnetic recording of code signals.

The invention further features recorders, such as, for example, telegraph printers, for receiving signals representing accounting data from a storing register, there preferably being a sufficient number of recorders less than the number of storing registers so that each recorder may receive signals from a plurality of registers with a minimum of idle time.

The invention also features an omnigraphic type of transmitter for transmitting motor stop signals to each of two interconnected stations at the close of message transmission therebetween, so that the motors at the calling and called subscribers' stations will be stopped and the communicative connection broken when either of the subscribers initiates the transmission of a signal for discontinuing the communicative connection and for restoring the subscriber's station apparatus and central office switching apparatus to normal.

Briefly, the principal elements of the system according to the present invention are a plurality of subscribers' stations, a central office station through which any two subscribers' stations may be interconnected and including machine switching apparatus for interconnecting any two subscribers' stations, a line identifier device for generating signals representing the station designations of a calling subscriber and of a called subscriber, a transmitting distributor for transmitting the line identification signals not only to be ultimately recorded at the central office for accounting purposes, but also to be recorded at the connected subscribers' stations, a master time transmitter for generating signals representing instant time, a signal storing register for storing line identification signals and time signals, and sequence switching devices for connecting the line identification signal transmitter and the time transmitter to the signal storing register and for subsequently connecting the register to a telegraphic recorder.

The subscriber's station may include a telegraph signal transmitter, a printing telegraph recorder, a motor starting and stopping control device, a call initiating key, and an impulsing dial for initiating impulses representing the identity of the station called.

The machine switching portion of the central office includes line finders controlled by the impulses generated in the subscriber's impulsing dial for completing a communicative connection between the calling station and the called station, a telegraph signal repeater, and supervisory and control relays.

The line identifier device includes a plurality of sets of alternating current transformers, there being a set of the transformers for each character, whether figure or letter, in the designation of a calling or called station. Each set of transformers consists of a sufficient number of transformers to represent by being permutationally energized or unenergized any character which may be employed in the designation of a subscriber's station. Each line identification transformer is enclosed in an electromagnetic shield and has a secondary winding which is connected to one of the segments of the line identification transmitting distributor. Each electromagnetic shield is slotted to permit a plurality of single conductors, each of which may serve as a primary for the transformer, to pass through the electromagnetic shield so that a portion of it may be in inductive relation to the core of the transformer and to the secondary for generating alternating current in the secondary when alternating current is applied to a conductor which serves as primary winding for a transformer. The plurality of single conductors are threaded through or around the electromagnetic shields of each set of transformers in permutation code manner, so that when any one of the single conductors is connected to a source of alternating current, it will induce alternating current in certain of the secondary windings in each set of transformers in permutation code manner. Each of the single conductors which traverses the sets of line identifying transformers is associated with one of the subscriber's lines, and as alternating current is connected to any one of the single conductors, the sets of line identifying transformers are energized permutatively to generate signals representing the designation of the station associated with that conductor.

The transmitting distributor serves to connect the line identifying transformer secondaries successively to an electronic rectifier which generates direct current signals corresponding to the line identification signals and supplies the signals through a register selecting sequence switch and through a register controlling sequence switch to a signal storing register.

The invention contemplates two types of signal storing registers, one of which stores signals magnetically and the other of which stores signals mechanically. The magnetic register includes a rotatable ferro-magnetic disc which may be magnetized under the control of an electromagnet in accordance with alternating current signals. The direct current signals from the electronic rectifier operate a polar relay which controls the application of alternating current from a local source to the winding of the magnetizing electromagnet of the register. The mechanical storing register which may be used instead of the electromagnetic register has a single magnet permutation code receiving selector mechanism and a plurality of sets of signal storing fingers which may be set successively in permutation code combinations under the control of the receiving selector mechanism.

The master time transmitter comprises a plurality of sets of code discs representing units and tens of seconds, units and tens of minutes, units and tens of hours, and the letters A and P representing A. M. and P. M. The code discs representing units of seconds are rotated step by step through an intermittent motion mechanism from a constantly rotating shaft operated by a synchronous motor driven from a time controlled source. A carry-over mechanism connects the code discs representing tens of seconds to those representing units of seconds and succeeding sets of code discs are connected to those preceding them through intermittent motion carry-over devices, so that the code discs are at all times presenting to transmitting contact control levers associated therewith notches and lugs representing permutation code signals corresponding to instant time, including designation of that time as being forenoon or afternoon. There is a set of transmitting cams for each set of transmitting contact control levers and the cams are rotatable in start-stop manner to effect generation at the transmitting contacts of permutation code signals representing instant time. The time signals are transmitted through the register controlling sequence switch after an impulsing cam contact associated with the time transmitter has stepped the register controlling sequence switch to connect the transmitting contacts of the time transmitter to the operating circuit of the signal storing register which, in the case of the magnetic register, is the polar relay for controlling the connection of the source of alternating current to the disc recording magnet, and in the case of the mechanical recorder is the selector magnet of the permutation code receiving selector mechanism. The master time transmitter becomes connected to the signal storing register upon establishment of a communicative connection between two subscribers' stations to register the time at which the charge starts and the message transmission may begin, and is again connected to the signal storing register at the conclusion of message transmission, so that the time of completion of the transmission will be registered.

Following the registering of the second set of time designating signals, the storing register, whether of the magnetic or mechanical type, is connected to a recording printer and the signals which were stored in the register are recorded in printed form for accounting purposes. Thus, a printed record of the identification of two stations which have been connected for communication purposes and the time of message initiation and message conclusion has been made, from which the elapsed time may be computed for the purpose of billing the subscriber for the communication rendered.

For a complete understanding of the invention, reference may be had to the following detailed description to be interpreted in the light of the accompanying drawings, wherein Fig. 1 is a schematic circuit view showing a subscriber's station;

Fig. 2 is a schematic circuit view showing that portion of a machine switching central office station which pertains to the setting up of connections between subscribers' stations and the repeating of signals over the communication circuit when completed, as well as supervisory and control apparatus pertaining to the line identification apparatus and signal registering apparatus;

Fig. 3 is a diagrammatic representation of a subscriber's station which may be identical with that shown in Fig. 1;

Fig. 4 is a schematic circuit diagram showing the line identifying signal generator, signal transmitter, signal rectifier, and register selecting sequence switch;

Fig. 5 is a combined schematic circuit diagram and mechanical view showing one form of signal storing register and a sequence switch by which the register is controlled;

Fig. 6 is an elevational view taken at the left of the mechanical portion of Fig. 5 showing details of the signal storing register;

Fig. 8 is a plan view showing a master time transmitter for generating and transmitting time signals;

Fig. 9 is a schematic circuit diagram showing a system for recording signals stored in the signal storing register shown in Fig. 5 or Fig. 7;

Fig. 10 is an elevational view taken at the left-hand end of Fig. 8;

Fig. 11 is a schematic diagram of the lowermost portion of the circuit featuring the omnigraph type of system transmitter.

Fig. 12 is a diagrammatic view showing how the sheets of drawings containing Figs. 1, 2, 3, 4, 7, 9, and 11 may be arranged to represent a telegraph communication and accounting recorder;

Fig. 13 is a plan view partly broken away and partly in section showing one of the line identification signal generating transformers;

Fig. 14 is a vertical sectional view taken on the line 14—14 of Fig. 13;

Fig. 15 is a diagrammatic plan view of the signal storing register shown diagrammatically in elevation in Fig. 7; and Fig. 16 is a diagrammatic view showing how the sheets of drawings containing Figs. 1, 2, 3, 4, 5, 9 and 11, may be arranged to represent a complete telegraphic communication and accounting information recorder system.

Figure 7:
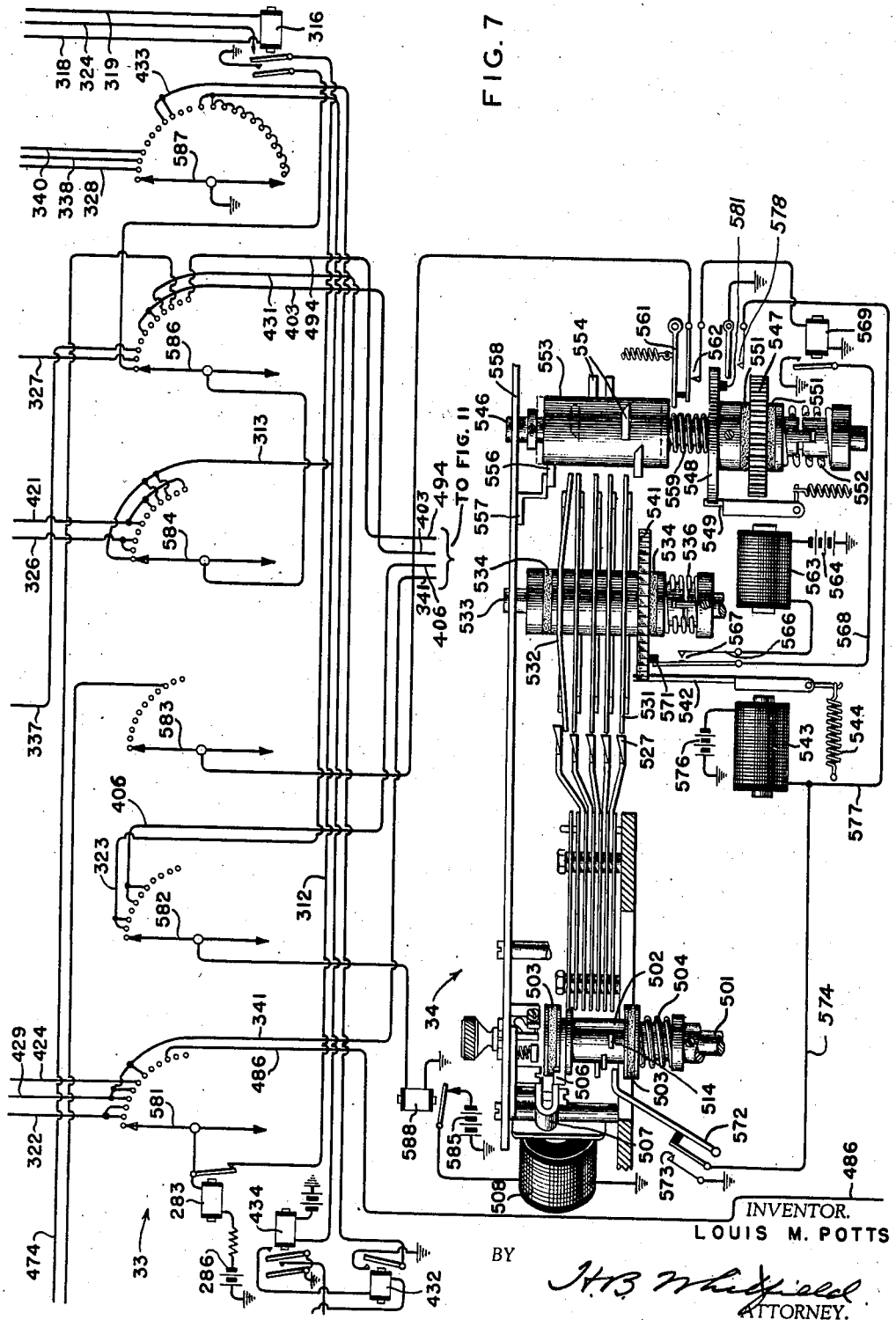
Fig. 7 is a combined schematic circuit diagram and mechanical view showing another type of signal storing register and sequence switch for controlling the register.

Referring now to the drawings, the reference numeral 21, Fig. 1, designates a subscriber's station, the reference numeral 22, Fig. 2, designates the line switching and the communication circuit portion of a central office station, the reference numeral 23 designates supervisory and control relay apparatus at the central station, the reference numeral 24, Fig. 3, designates a subscriber's station which may be identical with the station 21, the reference numerals 26, 27, 28, 29 (Fig. 4) designate respectively a line identifier signal generating apparatus, a line identification signal transmitting distributor, an electronic rectifier for alternating current signals generated in 26, and a link circuit finder switch. In Fig. 5, the reference numeral 31 designates generally a message register controlling sequence switch and the reference numeral 32 designates generally a magnetic type of message register. The reference numerals 33 and 34 (Fig. 7) designate respectively a message register controlling sequence switch similar to the switch 31 in Fig. 5 and a mechanical signal storing register. In Fig. 8 the reference numeral 36 indicates generally a master time transmitter, and in Fig. 9 the reference numeral 37 designates generally a telegraphic recorder and associated controlling apparatus.

Referring now to Fig. 1, the subscriber's station 21 is provided with a recording telegraph printer symbolized by the selector magnet 41 with which may be associated a telegraph transmitter 42. Printer 41 and transmitter 42 are driven by a motor 43 which has a speed regulator 44 comprising a resistance and a pair of contacts. One end of the winding of selector magnet 41 is connected to ground and the other end is connected to the upper contact of line relay 46 which has a polarizing winding and an operating winding. One end of the operating winding of line relay 46, which is the left-hand winding, is connected to line conductor 47 and the other is connected through the release key 48, break key 49, and transmitting contacts 42 to the front contact of relay 51.

One end of the winding of relay 51 is connected to ground and the other end is connected to conductor 52 which extends to the upper front contact of relay 53. Upper contact tongue 54 of relay 53 is connected to grounded battery 56 and upon the energization of relay 53 under circumstances which will be described hereinafter, battery 56 will be connected through conductor 52 to the winding of relay 51 and to one end of the biasing winding of line relay 46, the other end of which is connected to ground, and will also be connected to one end of the winding of audible signal controlling relay 57, to audible signal device 58 through the lower contact tongue 59 and associated back contact of relay 57, and to one terminal of direct current motor 43.

Contact tongue 61 of line relay 46 is connected to battery supplying conductor 52 and may engage either its upper contact which is connected to selector magnet 41 or its lower contact which is connected to ground.

The contact tongue 50 of relay 51 which is placed in the circuit of transmitting contacts 42 upon energization of relay 51 is connected by conductor 62 and conductor 63 to the lower contact associated with the upper right-hand contact tongue 64 of key 66. When key 66 is in normal or unoperated condition, contact tongue 64 engages its lower contact and extends the circuit from conductor 63 through conductor 67, winding of relay 68 to line conductor 69. From this, it will be apparent that the communication circuit at subscriber's station 21 includes line conductor 47, operating winding of relay 46, normally closed contacts of keys 48 and 49, transmitting contacts 42, contact tongue 50 of relay 51, conductors 62 and 63, contact tongue 64 of key 66, winding of relay 68 and line conductor 69.

Key 66 serves as means for associating a calling dial 71 with the line conductors 47 and 69. The preparation for dialing is accomplished by rotating the key operating lever in clockwise direction, whereby upper contact tongue 64 is moved out of engagement with its lower contact and into engagement with its upper contact, and intermediate contact tongue 72 and lower contact tongue 73 are moved into engagement with their respective make contacts below them. Left-hand contact tongue 74 of key 66 is not affected by clockwise rocking of the key operating lever. When key 66 has been operated, a dialing loop is connected across line conductors 47 and 69 from line conductor 47 through conductor 76, intermediate contact tongue 72 of key 66, make contact with which tongue 72 has become engaged, conductor 77, winding of relay 79, conductor 80, upper contacts 81 of dial 71, conductor 83, uppermost contact of key 66, contact tongue 64 of the key, and conductor 67 through winding of relay 68 to line conductor 69. Also through the intermediate contact tongue 72 at the right of key 66, a circuit is completed from ground through contact tongue 50 of relay 51, conductor 62, conductor 84, lower dialing contacts 85, conductor 86, lower contact tongue 78 of relay 79, conductor 77, fixed contact of key 66 and intermediate contact tongue 72 associated therewith, conductor 76, line conductor 47 extending to central office 22 (Fig. 2), branching conductor 87, extreme left-hand contact tongue 88 of cut-off relay 89, back contact associated with contact tongue 88, winding of relay 91 and grounded battery 92. The key 66 also closes a circuit through its lowermost fixed contact and contact tongue 73 from ground through conductor 93, upper contact tongue 94 and back contact of relay 79, lamp 96 to grounded battery 97.

From the foregoing, it will be apparent that the immediate effects of operation of key 66 by rotation of its control lever in clockwise direction will be the lighting of lamp 96 to indicate to the subscriber that the apparatus is in condition for dialing and not for telegraph message transmission or reception and the energization of relay 91 at central office station 22. Single contact tongue 98 of relay 91 is grounded and is engageable upon energization of relay 91 with a front contact connected to one end of the winding of relay 99, the other end of which is connected to grounded battery 101. Relay 99 may be designated as a start relay for the machine switching apparatus at central office station 22 and upon being energized attracts its three contact tongues 102, 103, and 104 into engagement with their front contacts. Contact tongue 102 of relay 99 is engageable with its front contact to complete a circuit from ground through contact tongue 106 and back contact of relay 89, conductor 107, contact tongue 102 of relay 99, conductor 108, winding of line finder subgroup relay 109 to grounded battery 111. The machine switching apparatus or line finder indicated by the apparatus enclosed in dotted line rectangle 112, operates in a manner disclosed in Singer Patent No. 1,958,930 granted May 15, 1934, and in due course, the line finder brushes connect with line conductors 47 and 69 and with local conductor 113.

Line finder 112 in operated position forms a holding circuit for holding the connected line 47 from grounded battery 114 through the winding of cut-off relay 89, front contact and contact tongue 104 of relay 99, conductor 116, line finder 112, conductor 117, and dotted line branch circuit 118 to ground. The dotted line branch circuit 118 includes subsequently effective release apparatus which is fully disclosed in the hereinbefore identified Singer patent, but a detailed explanation of its operation is not considered essential to an understanding of the present invention. Cutoff relay 89 thus becomes energized and attracts its previously identified contact tongues 88 and 106 and its contact tongues 119 and 121. Contact tongue 119 moves into engagement with a front contact which is connected directly to the winding of relay 89. The contact tongue is connected directly to conductor 117 so that a holding circuit for relay 89 is established directly through conductor 117 and branch circuit 118 to ground. Contact tongue 106 moves out of engagement with its back contact and thus disconnects ground from the previously identified energizing circuit for line finder magnet 109, whereby the magnet becomes de-energized with its brushes engaging the line conductors 47 and 69 and the holding circuit of relay 89. Contact tongue 88 opens the energizing circuit for relay 91 which, in turn, releases its contact tongue 98, thus opening the energizing circuit for relay 99 which becomes deenergized. Thus, all of the contact tongues of relay 99 are released after relay 89 has become energized and held.

With brush contact in line finder 112 engaged with the bank contacts associated with line conductor 47, the circuit of the line conductor which has been previously traced from the grounded back contact of relay 51 at the subscriber's station 21 (Fig. 1) through the winding of relay 91 now extends through the bank contact and brush of line finder 112, conductor 122, make-before-break front contact 123 of relay 120, fixed contact 124 with which front contact 123 co-operates, conductor 127, upper winding of repeater relay 128, contact tongue 129 of repeater relay 130, back contact with which contact tongue 129 is normally engaged, conductor 131, right-hand winding of differential relay 132 to grounded battery 133. Repeater relay 128 is polar and normally holds its contact tongue 134 in engagement with its front contact. However, upon completion of the circuit, from ground at the subscriber's station 21 to battery 133, current traverses the upper or line winding of relay 128 in a direction to urge its contact tongue 134 into engagement with its back contact which is connected to marking battery. The engagement of a brush in line finder 112 with the bank contact to which line conductor 69 is connected results in the extension of the circuit of line conductor 69 through the bank contact and brush of line finder 112, conductor 136, left-hand winding of polar relay 132, contact tongue and back contact of relay 137 and contact tongue and back contact of relay 138 to grounded battery 139, the connection of which between the left-hand winding of relay 132 and ground is opposite to that of battery 133 with respect to the right-hand winding of relay 132 and ground.

Since, as previously described, line conductor 47 is now connected to line conductor 69 through conductor 76, middle contact tongue 72 and associated fixed contact of key 66, conductor 77, winding of relay 79, upper contact 81 of dial 71, uppermost fixed contact and upper contact tongue 64 of key 66, conductor 67, winding of relay 68 to line conductor 69, all at subscriber's station 21, current flows through the joint influence of batteries 133 and 139 through the two windings of polar relay 132, through the winding of relays 68 and 79 at subscriber's station 21.

At the subscriber's station the relay 79 attracts both of its contact tongues, thus opening the circuit of lamp 96 which becomes extinguished and also disconnecting branch conductor 76 of line conductor 47 from the grounded back contact of relay 51. Relay 68 is polar and the direction of flow of current produced by the batteries 133 and 139 in series is such as to maintain the contact tongue of relay 68 in the position in which it is shown; namely, out of engagement with the single fixed contact with which it may co-operate.

Relay 146, the winding of which is connected to contact tongue 134 of repeater relay 128, is an impulsing relay, the function of which is to operate machine switching or line finding mechanism 147 which may be similar to line finding mechanism 112. The manner in which impulsing relay 146 controls line finder mechanism 147 is not disclosed herein but a full and complete disclosure of the impulsing operations and their effect upon line finder 147 is disclosed in the hereinbefore identified Singer patent and in Patent No. 2,088,750 granted August 3, 1937, to F. S. Kinkead. It is considered sufficient for the present purposes to state that when contact tongue 134 of repeater relay 128 has moved into engagement with its back contact, which is the condition when the circuit of the operating winding of relay 128 is completed from the ground at the back contact of relay 51 of subscriber's station 21 to battery 133 at central office 22, or from battery 139 to battery 133 through the dialing loop at subscriber's station 21 after relay 79 has been operated to disconnect the local ground, impulsing relay 146 will be energized and will attract its contact tongue into engagement with its front contact, whereas when the dialing loop circuit is broken by opening of the dial contacts due to operation of dial 71, the contact tongue of impulsing relay 146 will be oscillated in accordance with the dialing impulses.

It is to be noted that from the contact tongue 134 of repeater relay 128 a communication circuit comparable with that comprising line conductors 47, 122, and 127 extends through the upper winding of repeater relay 130, conductor 148, contact 149 normally engaged by a make-before-break front contact 151 of relay 152, and conductor 153 to a brush of line finder 147. Also, the line comprising conductors 69 and 136 is extended to line finder 147 by conductor 1480 which is connected to the same end of the left-hand winding of polar relay 132 that is connected to contact tongue of relay 137.

As impulsing relay 146 (Fig. 2) is operated under the control of dial 71 of subscriber's station 21 (Fig. 1), the line finder 147 is operated until the brushes associated with the conductors 153 and 1480 have been brought into engagement with bank contacts connected to the conductors 156 and 157, respectively, which are associated with the line circuit of station 24 (Fig. 3) which the subscriber at station 21 has dialed. Associated with line finder 147 are relays 158, 159, and 161 corresponding to relays 89, 91, and 99, respectively. When the line finder 147 has completed the connection of line conductors 153 and 1480 with line conductors 156 and 157, respectively, a relay 162 corresponding to relay 417 of the Singer patent is energized over a circuit not shown in the drawings associated with the present specification, but fully shown and described in the Singer patent, and the relay 162 attracts its contact tongue into engagement with its single front contact to connect ground through the secondary winding of an alternating current transformer 163, the function of which will be described later, and through the winding of a relay 164, thence through a conductor 166, brush and bank contact of line finder 147, conductors 167 and 168 and thence through winding of relay 158 to grounded battery 169. Thus, a holding circuit for the communication through line finder 147 is established by the energization of the circuit of relay 158 and through contact tongues and front contacts of the relay 158, the line conductors 156 and 157, are connected to the line conductors 171 and 172, respectively, which extend to the subscriber's station 24 (Fig. 3) which may be identical with the subscriber's station (Fig. 1).

In Fig. 2, the battery associated with the front contact of repeater relay 128 has been shown as connected by means of a dotted line. Likewise, the connection from contact tongue 134 of repeater relay 128 to the upper winding of repeater relay 130 has been shown in dotted line. This is intended to indicate that battery is not at all times connected to the front contact of repeater relay 128 and that contact tongue 134 of relay 128 is not at all times connected to the operating winding of repeater relay 130. As disclosed in the patent to Kinkead, the connections indicated in dotted lines are completed as an incident to the energization of the holding relay 138 for the line finder 147. From this point on in the present specification, it is to be assumed that the front contact of repeater relay 128 is connected to its battery and that the contact tongue 134 of relay 128 is connected to the operating winding of repeater relay 130.

The completion of the circuits of the repeater described in the foregoing paragraph results in the establishment of a communication circuit through the subscriber's station 24 (Fig. 3) traced from the battery associated with the back contact of repeater relay 128 through relay contact tongue 134, operating winding of repeater relay 130, conductor 148, contacts 149 and 151 associated with relay 152, conductor 153, conductor 156, extreme right-hand front contact and contact tongue of operated relay 158, line conductor 171, operating winding of the line relay at station 24 corresponding to line relay 46 at station 21, unoperated keys corresponding to the keys 48 and 49, contacts of the transmitter corresponding to transmitter 42 to front contact of the unoperated relay corresponding to relay 51. Another line circuit extends from grounded battery 139 at the central office station 22, back contact and contact tongue of relay 138, back contact and contact tongue of relay 137, conductor 1480, brush and bank contact of line finder 147, conductor 157, left-hand front contact and contact tongue of operated relay 158, line conductor 172 to the subscriber's station 24 and continuing at that station through the winding of the polar relay corresponding to relay 68 at station 21, upper contact tongue and lower associated contact of unoperated key corresponding to the key 66, conductors corresponding to the conductors 63 and 62 of station 21 to the contact tongue of unoperated relay corresponding to the relay 51 and thus engages ground. The direction of flow of current from battery 139 through the relay at station 24 corresponding to relay 68 at this time is such as to hold the contact tongue of the relay out of engagement with its single contact. No current flows through the operating winding of repeater relay 130 due to the fact that the circuit is open at a front contact of the unoperated relay corresponding to relay 51 of station 21. However, current flows from the battery associated with the back contact of relay 128 through contact tongue 134, biasing winding of relay 130 and artificial line to ground as a result of which contact tongue 129 of relay 130 is attracted into engagement with its front contact, thus substituting battery 176 for battery 133 in the line circuit which includes line conductor 47 extending to subscriber's station 21 (Fig. 1). Battery 176 is connected in reversed polarity from battery 133 and so opposes battery 139, thus creating substantially a no-current condition in the dialing loop circuit at subscriber's station 21.

The completion of connections through line finder 147 also results in momentary operation of relay 138 as fully disclosed in the patent to Kinkead to substitute battery 177 connected to the front contact of relay 138 for battery 139 in the dialing loop extending through station 21 and also at the end of conductor 1480 extending from station 24. Battery 177 is so connected as to assist battery 176, whereupon current flows through the dialing loop at station 21 and through polar relay 68 in a direction opposite to that in which current flowed prior to the substitution of battery 176 for battery 133. The flow of current through polar relay 68 is momentary but is of sufficient duration to move the grounded tongue of polar relay 68 into engagement with the single fixed contact of the relay, thus completing a circuit from ground through the contact tongue, conductor 178, winding of relay 53 to grounded battery 56. A holding circuit for relay 53 is completed through its lower contact tongue 179 and front contact, conductor 183 and closed contacts 184 to ground, so that the relay 53 will remain energized after current reversing relay 138 has returned to normal condition and contact tongue of polar relay 68 at subscriber's station 21 has returned to its right-hand position, as shown. The reversed current flows through the left-hand winding only of relay 132 and may result in operation of its contact tongue, but as no circuit is at this time prepared for completion through the contact tongue, the incidental operation of relay 132 will be idle.

Upon the energization of relay 53, its upper contact tongue 54 which is connected to battery 56 moves into engagement with its front contact which is connected to conductor 52. Thus, battery is connected to audible signal device 58 through the back contact and lower contact tongue 59 of relay 57, to relay 57 which does not become energized because the circuit of its winding is open at the left-hand contact tongue 74 of key 66, to motor 43 which is set in operation, to the biasing winding of polar line relay 46, to the tongue of line relay 46 and to the winding of relay 51, which is grounded at its opposite end.

Substitution of battery 177 for battery 139 also reverses the flow of current through conductor 1480, conductor 157, line conductor 172 extending to subscriber's station 24 to the ground engaged by the back contact of the unoperated relay corresponding to relay 51. Thus, the tongue of the polar relay at station 24 corresponding to the relay 68 is reversed to effect energization of the relay corresponding to relay 53, whereby battery is connected to the audible signal device, to the relay corresponding to relay 57, to the operating motor at station 24, to the biasing winding of its polar line relay, to the tongue of the line relay and to the relay corresponding to relay 51. Thus, at both stations the circuit of line relay 46 and transmitting contacts 42 is extended through the contact tongue 50 of relay 51 and through conductors 62 and 63 to the lower of the two contacts with which the upper contact tongue 64 of key 66 co-operates. At station 21 the tongue at this time is out of engagement with that contact due to the fact that key 66 is operated. The energization of the biasing winding of line relay 46 does not reverse the position of the contact tongue from that shown, and, therefore, battery is extended to the selector magnet 41 of the receiving printer to effect initiation of rest condition in the selector magnet preparatory to receiving telegraph signals. At the station 24 the relay corresponding to relay 51 becomes energized and completes the signaling loop through the polar line relay and through the transmitting contacts because the key corresponding to key 66 is presumed to be unoperated at this time.

The operation of the audible signal device 58 at subscriber's station 21 indicates to the subscriber that a communication circuit has been completed to the remote subscriber's station 24 and that both stations as well as central office apparatus have been prepared for the transmission of signals. It is necessary for the operator at station 21 to restore key 66 to normal condition in order to disable the dialing loop and to complete the signal transmission loop from line conductor 47 to line conductor 69 by restoring upper contact tongue 64 of key 66 to engagement with its lower fixed contact. In order to disable audible signal device 58 so that it will not continue to operate during signal transmission, the operator at station 21 may rock the operating lever of key 66 in counterclockwise direction beyond its normal position to effect momentary engagement of left-hand contact tongue 74 with its fixed contact. This completes the circuit of relay 57 which attracts its lower contact tongue 59 to open the circuit of audible signal device 58 and which also attracts its upper contact tongue 181 to complete a holding circuit for the relay 57, whereupon key 66 may be restored to normal position. At station 24 the audible signal device corresponding to the signal device 58 indicates to the subscriber at that station that the station has been connected to a calling subscriber. The key corresponding to key 66 is presumed to be in normal position but the subscriber at station 24 may disable the audible signal device by momentarily rocking the operating lever of key 66 in the direction to close contacts for completing the circuit of the relay corresponding to the relay 57, which establishes for itself a holding circuit and remains energized. The subscriber at station 21 does not immediately initiate transmission of signals to station 24, as in accordance with the present invention there is no provision for an answer-back to be recorded at the station 21 which is the identity of the subscriber's station 24 to which station 21 has been connected.

Reference has previously been made to the energization of relay 162 which attracts its contact tongue to complete a circuit for the energization of relay 164 from ground through the secondary of alternating current transformer 163, contact tongue of relay 162, winding of relay 164, conductor 166, brush and bank contact of line finder 147, conductors 167 and 168, winding of relay 158, and battery 169 to ground. Relay 164 has a single contact tongue 192 which is connected to one terminal of a condenser 193, the other terminal of which is connected to ground. Contact tongue 192 normally engages its back contact which is connected to grounded battery 194. Thus, condenser 193 normally carries a charge applied by battery 194 and upon energization of relay 164, condenser 193 discharges through contact tongue 192, conductor 196, winding of relay 197, conductor 198, and back contact and contact tongue 199 of relay 201 to ground. The impulse supplied by condenser 193 energizes relay 197 which establishes a holding circuit from battery 202 through inner contact tongue 203 and front contact and winding of relay 197, conductor 198 and contact tongue 199 of relay 201 to ground. Outer contact tongue 204 of relay 197 is engageable with a grounded front contact to complete an energizing circuit through the winding of switching relay 206 to grounded battery 207. Switching relay 206 remains energized as long as the holding circuit of relay 197 is energized and attracts three contact tongues 208, 209, and 211 into engagement with their associated front contacts, the function of which is to control the transmission of line identification signals from a line identifier apparatus, which will now be described.

Referring now to Fig. 4, the reference numeral 26 designates a line identification signal generator apparatus which, according to the preferred embodiment of the invention, consists of five sets of alternating current transformers, each set of which consists of five transformers 216. One of the transformers is shown in detail in Figs. 13 and 14 to which reference may now be had.

The transformer 216 includes a rectangular core 217 providing a closed magnetic path. One of the long sides of core 217 carries a secondary winding 218. The transformer 216 is enclosed in an open ended cylindrical electromagnetic shield 219 which is provided with diametrically opposed elongated slots 221 parallel to the axis of cylindrical shield 219 and not longer than the longitudinal dimension of the opening in rectangular core member 217.

A plurality of single conductors, such as the conductors 222 and 223, are arranged to serve individually as primaries for the transformers 216. Any one of the conductors, such as 222 or 223 serves as primary only for selected ones of the transformers. A conductor which is arranged to serve as primary for a particular one of the transformers 216 enters the transformer through one of the slots 221 in the electromagnetic shield 219, threads the core 217 next to the secondary winding 218 and emerges from the transformer through the diametrically opposed slot. The conductor 222 in Fig. 14 is an example of a conductor serving a transformer as primary. A conductor which is not to serve a particular transformer as primary extends across the outside of the electromagnetic shield 219 and is prevented by the shield from influencing the core and secondary winding within the shield. The conductor 223 in Fig. 14 is an example of a conductor which does not serve the transformer 216 as primary. Fig. 13 shows one of the transformers 216 with a plurality of single conductors, the first, second, third, sixth, seventh, and eleventh of which, counting from the left, serve the transformer 216 as primaries, and the fourth, fifth, eighth, ninth and tenth of which pass across the outside of shield 219 and are not enabled to influence the transformer within the shield.

In Fig. 4, the relation of the engine conductors, such as the conductors 222 and 223 to the five sets of transformers 216, is shown. It is to be noted that each of the single conductors serves some of the transformers as primaries and passes around the outside of the shield of the remainder of the transformers. The relation of any one of the single conductors, such as the conductors 222 and 223, to the transformers 216 of one set, represents a permutation code combination, the transformers which the conductors serve as primary representing a marking condition and the transformers which a conductor does not serve as primary representing a spacing condition. Thus, the relation of any one of the single conductors to the five sets of transformers 216 represents five permutation code signal combinations.

At their terminals, as shown at the bottom of Fig. 4, all of the single conductors, such as 222 and 223, are connected to individual condensers 224, the opposite sides of which are connected to ground. Tracing single conductor 222 backwardly from the point at which it begins to be associated with the first of the transformers 216, it will be noted that it is connected to the right-hand front contact of relay 99. From this point, a circuit may be traced through conductor 226 over which line finder holding relay 89 became energized, innermost right-hand front contact of relay 89, and inner right-hand contact tongue 119 and thence through bank contact and brush of line finder 112 and over conductor 117, condenser 225 to one end of the secondary winding of an alternating current transformer 227, the other end of which is connected to ground. From the secondary winding of transformer 227, the conductor 222 is adapted to receive alternating current which, traversing the conductor 222 will induce an alternating voltage in those of the transformers 216 which the conductor 222 serves as primary, whereas those which the conductor does not serve as primary will not be influenced by the alternating current traversing the conductor. The single conductor 223 which has been shown in dotted lines solely for the purpose of distinguishing it from conductor 222 as the two conductors traverse the transformers 216 extends back to the junction of conductor 167 with conductor 166 and the circuit may be traced through conductor 166, winding of relay 164, contact tongue and front contact of relay 162 to one end of the secondary of transformer 163, the other end of which is connected to ground. It is to be noted with reference to both of the circuits for supplying alternating current to the line identifying transformers that the sources of alternating current, namely, the secondaries of the alternating current transformers, are connected to the brushes of the line finders and may be connected to the bank contacts associated with any of the subscriber's lines, whereas the single conductors, such as 222 and 223, terminate at bank contacts in the line finders and are, therefore, individual to the subscriber's communication circuit. It is to be understood that there is a single conductor for controlling the line identification transformers associated with every set of subscriber's line connecting apparatus. Each of the alternating current transformers 163 and 227 has a primary winding which becomes connected to a source of alternating current 228 through sequence switch 31 (Fig. 5) as will presently be described.

Referring again to Fig. 4, there is a transmitting distributor 27 associated with the line identifier apparatus 26. At the right of the transmitting distributor 27 is a row (which in actual practice would probably be a ring) of segments insulated from each other. A local source of alternating current 231 is connected through transformer 232 to certain of the distributor segments, as will be developed in the following description.

The first segment at the top of the row of segments is that engaged by the distributor brush when distributor brush arm 233 is at rest, it being understood that brush arm 233 is arranged to be frictionally driven from a constantly rotating shaft, preferably through a friction clutch. In the idle condition of distributor 27, brush arm 233 is held arrested by stop arm 234 controlled by magnet 236. The first segment is connected to transformer 232, the local source of alternating current and the segment therefor represents a marking or rest condition. The second segment has no electrical connection and represents spacing or start condition. The next five segments are connected to transformer 232 in permutation code manner to represent the shift or figures signal combination and these are followed by a segment connected to transformer 232 to represent a stop impulse. Next, there is a start segment after which five segments are connected to the secondary windings of the five transformers 216 in the first set followed by a segment connected to transformer 232 as a stop impulse segment pertaining to the permutation code signal generated in the first set of transformers. Thereafter, the next three sets of transformers 216 have their secondaries connected to individual segments, each set of connections being preceded by a free segment representing a start impulse and being followed by a segment connected to transformer 232 representing a stop impulse. Following the stop impulse segment for the fourth set of line identification transformer segments, there is a start impulse segment followed by five segments connected to transformer 232 to represent unshift or letters signal combination. The letters signal combination group of segments is followed by a stop segment connected to transformer 232. Following the last mentioned stop segment, there is a start segment after which the remaining five segments are connected to the five transformers in the final group of line identification transformers. The first four sets of transformers 216 provide permutation code signal combinations of alternating current representing four figures assigned to designate a subscriber's station, and the permanently applied shift signal combination preceding the segments connected to the first group of transformers 216 provides a signal for conditioning a telegraph printer to print figures corresponding to the code combination. The final group of transformers 216 is intended to provide code combinations representing letters which serve as a classification designation for a subscriber's station, and the permanently coded segments preceding the last group of transformers provide an unshift signal combination in order to condition a telegraph printer for recording letters.

The extreme right-hand brush is connected electrically to an adjacent brush which engages a conductive strip 2340 which is coextensive with a strip of single segments but which has the portion that is coextensive with the last six segments insulated from the remainder of the strip. The portion of distributor strip 2340 which is coextensive with all but the last six segments of the row of segments is connected by conductors 236 and 237 to the input circuit of a vacuum tube amplifier and detector or rectifier 28. The portion of strip 2340 which is coextensive with the last six segments is connected by conductor 238 to contact tongue 239 of relay 241. Back contact of relay 241 which is normally engaged by contact tongue 239 is connected by conductor 242 to conductor 237 which extends to the input circuit of rectifier 28, so that signals generated in the last set of transformers 216 will or will not be applied to the input circuit of the electronic rectifier, depending upon whether or not relay 241 remains de-energized at the time that the brushes traverse the segments.

The two left-hand brushes of distributor 27 are electrically connected together and engage strips which have no electrical connection with the exception of their short segments 243 and 244 which are insulated from the main bodies of the strip and are coextensive only with the last of the segments in the row at the extreme right of the distributor. Segment 244 is connected to ground, while segment 243 is connected to a brush of sequence switch 29, as will be described later.

The output or plate circuit of electronic rectifier 28, which has been shown diagrammatically as a single stage, but which would in practice require amplification stages, includes the winding of a relay 246 which is energized when the electronic rectifier has alternating current applied to the grid thereof from one of the segments in the row at the right of distributor 27. When the right-hand brush of the distributor engages a segment which is not connected to the transformer 232 or which is connected to the secondary of a transformer 216 that is not energized from one of the single conductors, such as 222 and 223, the relay 246 will be de-energized. Relay 246 operates contact tongues 247 and 248 both of which are connected to grounded batteries, the latter contact tongue being connected to battery through an adjustable resistance.

Link circuit finder switch 29 has six banks of contacts engaged by six contact brushes numbered 251, 252, 253, 254, 256, and 257. Brush 251 is connected by conductor 258 to the front contact with which contact tongue 248 of line identification signal responsive relay 246 co-operates. Brush 252 is connected by conductor 259 to one end of the winding of start magnet 236 for distributor 27, the other end of which is connected to grounded battery 261. Brush 253 is connected by conductor 262 to segment 243 of distributor 27. Brush 254 is connected by conductor 263 to the back contact with which contact tongue 247 of relay 246 co-operates. Brush 256 is connected by conductor 264 to one end of the winding of stepping magnet 266 for the sequence switch 29 and also to interrupter contact tongue 267 operated by the stepping magnet. The other end of the winding of stepping magnet 266 is connected to grounded battery 268. The final brush 257 is connected by conductor 269 to one end of the winding of relay 241, the other end of which is connected to grounded battery 271.

Before proceeding with the description of the connections to the banks of contacts of the finder switch 29, the function of which is to select the particular supervisory and control apparatus associated with a link circuit connection between two subscribers' stations to provide for the transmission of line identification signals pertaining to the two interconnected subscribers to the signal storing register associated with that supervisory and control apparatus, it appears advisable to describe the sequence switch 31 which controls the storing of successive code signals which ultimately provide records for accounting purposes. Sequence switch 31 comprises seven banks of contacts with which co-operate the seven contact brushes 275, 276, 277, 278, 279, 281, and 282. Brush 275 is connected by a conductor 285 to one end of the winding of a relay 291 which controls the starting of a signal storing register. The other end of the winding is connected to grounded battery 295. Brush 276 is connected to one end of the winding of stepping magnet 283 for the sequence switch 31 and also to interrupter contact tongue 284 controlled by stepping magnet 283. The other end of the winding of stepping magnet 283 is connected to grounded battery 286. Brush 277 is connected by conductor 287 through the winding of polarized relay 288 then through the winding of polarized relay 289 to ground. Brush 278 is connected by conductor 292 to the lower fixed contact of polarized relay 289. Brush 279 is connected by conductor 293 to brush 281. Brush 282 is connected to ground.

The polarized relays 288 and 289 and the relay 291 control the magnetic signal recorder indicated generally by the reference numeral 32 (Fig. 5). As shown in Figs. 5 and 6, a rotatable shaft 296 carries a disc 297 to which rotation may be imparted from shaft 296 through friction clutch 298. Disc 297 is of ferro-magnetic material suitable for magnetic recording and may be magnetized in accordance with an audible frequency oscillatory current flowing in the winding 301 to magnetize the poles 299 of an electromagnet 301. Disc 297 is rotatable between the opposed poles 299 of the electromagnet so that magnetic flux flowing from one to the other of the two poles shall traverse the disc 297. Magnetic recording apparatus of this general type is well known.

One end of the winding of electromagnet 301 is connected to ground and the other end is connected to the contact tongues of polarized relays 288 and 289. The contact tongue of relay 288 normally engages the lower fixed contact which has no electrical connection. The contact tongue is movable into engagement with an upper contact which is connected to the secondary of an alternating current transformer 290, the primary of which is connected to a local source of alternating current. The opposite end of the secondary of transformer 290 from that connected to the contact of relay 288 is connected to the movable contact of a potentiometer 300 across which is connected battery 310. The purpose of the source of direct current comprising battery 310 and potentiometer 300 is to bias the magnetizing current to enable utilization of the steepest portion of the magnetization curve. The reason for providing the local source of alternating current is that the magnetic recorder is responsive only to oscillatory current, whereas the electronic rectifier 28 and relay 246 associated with line identification signal transmitter 27 deliver direct current signals. Magnetic registering disc 297 has secured thereto a stop disc 302 which is provided with a main stop lug 303 and a plurality of subordinate stop lugs 304. A start magnet 306 has one end of its winding connected to grounded battery and the other end of the winding connected by conductor 307 to front contact of relay 291. The single contact tongue associated with relay 291 is connected to ground. The armature 308 for start magnet 306 is carried by a start and stop lever 309 which is biased in clockwise direction by spring 311 and is operable in counterclockwise direction by magnet 306. In the idle condition of the magnetic signal register 32, relay 291 is de-energized and, therefore, start magnet 306 is de-energized and the start and stop lever 309 is in extreme clockwise position. In this position, the right-hand end of lever 309 is presented in the path of principal stop lug 303 of stop disc 302 and holds magnetic registering disc 297 arrested. When magnet 306 becomes energized, lever 309 is rocked to extreme counterclockwise position, whereby its right-hand end is moved out of the path of principal stop lug 303 and magnetic recording disc 297 will be rotated counterclockwise by shaft 296 through friction clutch 298. Differing from principal stop lug 303, the subordinate stop lugs 304 are at such distance from the axis of shaft 296 that their path is blocked by the right-hand end of start and stop lever 309 when that lever is held in counterclockwise position by magnet 306. It follows that if magnet 306 is energized at the time one of the subordinate stop lugs 304 approaches lever 309, the magnetic recording disc 297 will be arrested, and will be released upon the de-energization of start magnet 306.

Since the operation of magnetic register 32 to record line identification signals is controlled from the sequence switch 31, further attention will now be given to that switch. In the normal or rest position of the switch, the first and second brushes 275 and 276 which are connected to relay 291 and to stepping magnet 283 respectively engage their first contacts in the banks which are free or dead contacts. Thus, in the normal position of the switch, relay 291 is de-energized and the stepping magnet 283 cannot be started or operated under the control of brush 276. However, the back contact which the contact tongue 284 of stepping magnet 283 normally engages is connected by conductor 312, and branch conductor 313 to the first contact in the fifth bank of contacts, which brush 279 is then engaging. Thus, a circuit is extended through brush 279, conductor 293, brush 281, conductor 314 to the left-hand contact tongue of a relay 316. The front contact with which the contact tongue is engageable upon energization of relay 316 is connected to ground whereby the energizing circuit for stepping magnet 283 is completed upon the energization of relay 316. The circuit of relay 316 extends from the grounded back contact with which the lowermost contact tongue 211 of relay 206 (Fig. 2) co-operates, through the conductor 317, branching conductor 318, winding of relay 316, conductor 319 to the sixth contact in the fifth bank of contacts of finder switch 29 (Fig. 4), which is the bank of contacts with which brush 256 co-operates. As many of the contacts in the banks of contacts of finder switch 29 as there are link circuit systems including supervisory and control relays, signal storing registers, and register control sequence switches in the central office station 22 (Fig. 2) will be connected to such link circuit systems, signal storing registers, etc., and each of the contacts in the fifth bank, counting from the top, will be connected to a conductor corresponding to the conductor 319 and extending through the winding of a relay corresponding to the relay 316 and eventually to the lowermost contact tongue of a relay corresponding to the relay 206. In the present disclosure, only one set of connections for the link circuit to the banks of contacts in finder switch 29 has been shown.

It will be apparent that the energizing circuit for relay 316 (Fig. 5) cannot be completed until brush 256 has been stepped in counterclockwise direction to engage the sixth contact in its contact bank. The brushes in finder switch 29 have no normal position, but remain in any random position in which they have been left when the finder is released by a link circuit, until called upon to seek connection with another link circuit. When the relay 206 of the link circuit shown herein operates, an energizing circuit for the stepping magnet 266 may be traced from grounded battery 268, winding of magnet 266, interrupter contact tongue 267 and back contact of the magnet 266, conductor 321, to conductor 317 and thus through contact tongue 211 of relay 206 to ground. Thus, upon the energization of switching relay 206 which, as previously described, becomes energized following the operation of relay 162 upon completion of the communication channel from subscriber's station 21 to subscriber's station 24, the stepping magnet 266 becomes energized. As such sequence switches usually move the stepping pawl along the ratchet to pick up the next tooth of the ratchet in the operating stroke and advance the brushes on the back stroke of the pawl when the stepping magnet becomes de-energized, the energization of stepping magnet 266 does not immediately effect the advancement of the brushes 251 to 257, inclusive. Upon becoming energized, the stepping magnet 266 attracts its contact tongue 267 out of engagement with its back contact through which the magnet was energized, thus interrupting the energizing circuit. Accordingly, stepping magnet 266 becomes de-energized and steps the brushes to the next contacts of the banks. It is convenient to assume for the purposes of the immediately following description that none of the bank contacts of finder switch 29 ahead of the sixth has any connection to other apparatus, and, therefore, that the brushes 251 to 257, inclusive, find no line condition in the first five contacts. The de-energization of stepping magnet 266 results in restoration of its contact tongue 267 to engagement with its back contact whereby the interrupted stepping magnet energizing circuit is reclosed and the magnet again becomes energized. The stepping pawl then picks up the next tooth on the stepping ratchet, the energizing circuit of the stepping magnet is interrupted and the brushes are stepped to the third bank contacts. This stepping operation is repeated until the brushel 251 to 257, inclusive, are stepped into engagement with the sixth bank contacts. At this point a substitute energizing circuit for the stepping magnet 266 may be traced from grounded battery 268 through the winding of magnet 266, conductor 264, brush 256, conductor 319, winding of relay 316 (Fig. 5), conductor 318 and conductor 317 to contact tongue 211 of relay 206 to ground. The attraction by stepping magnet 266 of its contact tongue 267, therefore, does not interrupt the energizing circuit for the stepping magnet and it remains energized to prevent further stepping of the brushes 251 to 257, inclusive.

Referring now to the assumption made in the foregoing paragraph as to the electrical isolation of the contacts in sequence switch 29, it may be stated that in actual practice they will not be free contacts, but will have connections corresponding to those of the sixth contacts extending to other apparatus duplicating the apparatus shown in Figs. 2 and 5. The connection of ground to any conductor corresponding to conductor 317 will start finder switch 29, and it will continue to operate until brush 256 encounters a contact which is connected to a conductor corresponding to conductor 317 that is grounded. The circuit to magnet 266 through interrupter 267 will then be shunted and the magnet will remain energized. It will be apparent from this that the brush 256 may stop before reaching the segment which is connected to the grounded conductor that started the stepping operation. For example, if the brush encountered a grounded circuit on one of the first five contacts, it would have stopped and waited until the operations to be performed at that position had been performed, after which the circuit which had initiated the advancement of the brushes would again assume control and restart them. Finder switch 29 has no homing control apparatus. It remains in any position until called upon to advance to another position.

The energization of relay 316 (Fig. 5) in series with the stepping magnet 266 for finder switch 29 results in the movement of its left-hand contact tongue into engagement with the grounded front contact whereby a circuit is completed from ground through the front contact and left-hand contact tongue of relay 316, conductor 314, first contact and brush 281 of the sixth bank of sequence switch 31, conductor 293, fifth brush 279 and first bank contact of sequence switch 31, conductor 313, conductor 312, back contact and interrupter contact tongue of stepping magnet 283 and magnet 283 to battery. Stepping magnet 283 becomes energized and advances its stepping pawl to pick up the next tooth on the stepping ratchet, and also interrupts its own energizing circuit by attracting its contact tongue 284 out of engagement with the back contact, whereupon the stepping magnet 283 becomes de-energized and executes its back stroke to advance brushes 275 to 282, inclusive, from the first to the second contacts of the banks.

In the first bank of contacts the brush 275 engages the second contact which is connected to ground so that relay 291 becomes energized and completes the circuit of start magnet 306 of storing register 32. The magnet attracts its armature lever which permits the disc 297 to rotate. In the second bank of sequence switch 31 brush 276 now engages the second contact which is electrically connected to the third contact and from which a circuit may be traced over conductor 322 to the sixth contact of the third bank of contacts of sequence switch 29 and from that point through brush 253 and conductor 262 to segment 243 of distributor 27. As segment 243 is not at this time engaged by brushes, no circuit is completed through brush 276 through the stepping magnet 283.

The brush 277 now engaging the second contact in the third bank of sequence switch 31, to which the third contact is connected, electrically completes a conductive path from ground at the winding of polarized relay 289, polarized relay 288, conductor 287, brush 277, conductor 323, right-hand contact tongue and front contact of relay 316, conductor 324 to the sixth contact of the fourth bank of contacts in finder switch 29, thence through brush 254, conductor 263, to the back contact of rectifier controlled relay 246 to grounded battery. Since, as previously described, the rectifier 28 is at this time rectifying alternating current applied to the uppermost of the segments at the right of distributor 27, representing a marking signal, the contact tongue 247 of relay 246 is out of engagement with its back contact. The contact tongue of polarized relay 288 remains in engagement with its lower contact and transformer 290 is not connected to magnet 301. With this arrangement magnet 301 is not energized in response to a marking signal but would be energized in response to a spacing condition. The reason for this is that disc 297 will not record a signaling condition when at rest, and, therefore, the marking condition is best represented by unenergized condition of the disc 297. Relay 289 is oppositely polarized to relay 288 and its contact tongue is not moved when relay 289 is under the influence of the battery associated with contact tongue 247, so that they respond to opposite polarities of current only.

As shown in Fig. 5, the second contact of the fourth bank of contacts is dead, as are also the third, fourth, fifth, sixth, seventh, and eighth of that bank so that no circuit is completed at this time to contact tongue 278. In the fifth bank of contacts, the second and third contacts are connected together and from them conductor 326 extends to one side of the source of alternating current 228 (Fig. 2). Accordingly, a conductive path may be traced from the right-hand connection to the source of alternating current 228 through conductor 326, second contact of the fifth bank of sequence switch 31, brush 279, conductor 293, brush 281 to the second contact of the sixth bank of contacts and from there through conductor 327 through primary winding of alternating current transformer 163 to the left-hand connection of source of alternating current 228. Thus, the brushes 279 and 281 and their second bank contacts complete the circuit for the primary winding of the transformer and alternating current is induced in the secondary winding, which traverses the circuit comprising front contact and contact tongue of relay 162, winding of relay 164 which is a direct current relay and is not affected by the alternating current, conductor 166 and single line conductor 223 to energize that conductor and, therefore, the secondary windings of certain of the line identification transformers 216 (Fig. 4) in accordance with the designation of the station of the called subscriber.

It is to be noted that the energizing circuit through which stepping magnet 283 for sequence switch 31 was energized to effect stepping of the brushes to the second bank contacts was through the first contacts of the fifth and sixth banks in sequence switch 31 and through brushes 279 and 281. This circuit was interrupted when the brushes stepped to their second positions and, therefore, there is no energizing circuit for the stepping magnet 283 and the brushes 275 to 282, inclusive, of sequence switch 31, remain in engagement with their second bank contacts.

Brush 282 which is connected to ground now engages the second bank contact in the seventh bank, from which conductor 328 extends to one end of the winding of relay 120 (Fig. 2) from the other end of which conductor 329 extends to the middle front contact of relay 206 now engaged by contact tongue 209 from which conductor 331 extends to the sixth contact of the second bank of contacts in sequence switch 29, now engaged by brush 252 from which conductor 259 extends to the winding of start magnet 236 of transmitting distributor 27, so that start magnet 236 trips the stop arm 234 for brush arm 233 and the brushes begin to traverse the conductive segments and strips of distributor 27. Relay 120 becomes energized in series with start magnet 236 and attracts its left-hand contact tongue to connect holding battery to the winding of repeater relay 128. The middle contact tongue of relay 120 engages make-before-break front contact 123 and disengages it from fixed contact 124, thereby engaging the contact tongue with conductor 122 which extends to the line conductor 47 of subscriber's station 21.

The middle contact tongue of relay 120 is connected by conductor 332 and thence through conductor 333, upper front contact and upper contact tongue 208 of energized relay 206, conductor 334 to the sixth contact of the first bank in sequence switch 29 (Fig. 4) from which brush 251 extends the circuit of conductor 334 over conductor 258 to the front contact with which contact tongue 248 of relay 246 is now engaged. Thus, the battery connected to contact tongue 248 of relay 246 is substituted for the battery 133 at the central office, so that as contact tongue 248 is oscillated by relay 246, in accordance with the signals impressed upon the segments at the right of distributor 27, line relay 46 at subscriber's station 21 will follow such oscillations and will cause the printer represented by selector magnet 41 at station 21 to record the signals generated in line identifier apparatus 26 corresponding to the identification of subscriber's station 24 (Fig. 3) to which subscriber's station 21 is connected. Relay 132 may operate its contact tongue during the signaling from relay 246, due to the fact that the left-hand winding becomes energized and de-energized in accordance with the signals, but no circuit is prepared for completion through the tongue of relay 132 at this time. The identity of the called subscriber's station is thus transmitted to the calling subscriber but not to the called subscriber, since that information is of no interest to him, and is also recorded on the magnetic recording disc 297. The speed of rotation of shaft 296 is such that the first of the subordinate stops 304 will come into engagement with attracted stop lever 309 of the magnetic storing register about the time but not before the time that the brushes of distributor 27 have traversed all of the segments at the right of the distributor and have returned to the stop position.

The signal generated by the last group of line identification transformers 216 represents station classification which is of interest in connection with accounting records at the central office only as to a calling station, but is not of interest to the calling subscriber at station 24. Accordingly, the relay 120 is provided with a right-hand contact tongue connected to ground and engageable with a front contact from which a circuit extends through conductor 336, sixth contact of the lowermost bank of contacts in sequence switch 29, brush 257, conductor 269, winding of relay 241 to grounded battery 271. Relay 241 is thus energized to disconnect the portion of the collector ring coextensive with the last six segments at the right of distributor 27 from the remainder of the collector ring so that a signal corresponding to the classifictaion of the station of the called subscriber will not be transmitted to the calling subscriber at station 21 and will not be recorded on the magnetic storing register 32.

As the left-hand pair of brushes of distributor 27 traverse segments 243 and 244, an energizing circuit for the stepping magnet of sequence switch 31 (Fig. 5) is completed from ground through segment 244, the brushes of the distributor, segment 243, conductor 262, brush 253 of sequence switch 29, sixth contact of the third bank of contacts, conductor 322, second contact of the second bank of contacts of sequence switch 31, brush 276, winding of stepping magnet 283 to grounded battery 286. The brushes 275 to 282, inclusive, are thus stepped to the third contact of each bank. The third contact of the first bank of contacts is dead, and the relay 291 is, therefore, released, and thus start magnet armature 309 is released. Since the second and third contacts in the second, third, and fifth banks are electrically connected together in pairs, no circuit changes occur due to stepping of those brushes. Neither does any change occur due to the stepping of brush 278 as it again engages a free or dead contact. In the sixth bank of contacts, brush 281 moves out of conductive relation to conductor 327 and into conductive relation to a conductor 337 which extends to the primary winding of alternating current transformer 227. Thus, the secondary winding of alternating current transformer 227 becomes energized and alternating current is applied through conductor 117, contact tongue 119 of cut-out relay 89, front contact with which contact tongue 119 co-operates, conductor 226, and conductor 222 which extends to the line identifying apparatus 26 and traverses the transformers 216 in permutation code manner to effect energization of the secondaries of certain of the transformers in representation of the identification of the station 21 (Fig. 1).

In the seventh bank of contacts of sequence switch 31, ground is connected through brush 282 to the third contact of the bank and from that point through conductor 338, winding of relay 152, conductor 339, conductor 329, front contact and middle contact tongue 203 of relay 206, conductor 331, brush 252 of sequence switch 29, conductor 259, winding of start magnet 236 of transmitting distributor 27 to grounded battery 261. Thus, the start magnet 236 is energized in series with relay 152 to release the distributor brush arm 233 for rotation. The function of relay 152 is similar to that of 120 in that it connects the repeating contact tongue 248 of relay 246 associated with rectifier 28 to the line conductor 171 extending to subscriber's station 24 (Fig. 3), and as the relay 152 disconnects line conductor 171 from the repeater at the central office station, it connects to the repeater a holding battery through its left-hand contact tongue and front contact. Thus, the distributor 27 is set in operation for a second cycle and in that cycle, it collects from the row of segments at the right of the distributor and applies to the rectifier 28 signals representing first the figures shift, then signals representing four digits which constitute the identification of station 21 (Fig. 1) after which the letter shift combination is transmitted, the right-hand distributor brush concluding this transmission when it reaches the seventh segment from the bottom in Fig. 4. The signals rectified in the rectifier 28 are repeated by the relay 246 from contact tongue 247 to the magnetic storing register 32 through polarized relay 288 and from contact tongue 248 to the receiving printer at subscriber's station 24.

During the previously described first cycle of distributor 27, the relay 291 remained energized through brush 275 and the second contact of the first bank of contacts, and in turn, held the start-stop magnet 306 energized to hold the lever 309 in the path of the first of the subordinate stops 304. However, the release of relay 291 and start magnet 306 when the brushes were stepped results in the restoration of start lever to normal position through its spring 311. The first subordinate stop lug 304 therefore escapes, and disc 297 begins to rotate. As the distributor 27 operates, signals representing the identification of the calling subscriber's station 21 are transmitted to the called subscriber's station 24 and are recorded in the magnetic storing register disc 297.

Relay 152 which is at this time energized has no contact tongue corresponding to the right-hand contact tongue of relay 120. Accordingly, no energizing circuit is completed over conductor 336 and brush 257 of finder switch 29 for relay 241. It follows that in this cycle of transmitting distributor 27, the portion of the collector ring 2340 which is coextensive with the segments connected to the last group of station identification transformers 216 is not disconnected from the main body of the ring 2340 and the signal representing the classification of subscriber's station 21 is recorded by the signal storing register 32 and is transmitted to the called subscriber's station 24. This last information may or may not be of interest to the called subscriber but since it is desirable to record it in the storing register, there is no particular reason for stopping its transmission to the called subscriber's station.

Just before distributor 27 comes to rest at the end of its second cycle, its left-hand pair of brushes traverse the segments 243 and 244 to complete again a previously identified circuit for the energization of stepping magnet 283 of sequence switch 31. The brushes 275 to 282, inclusive, are thus stepped to the fourth segment of the banks of contacts with which they co-operate. The fourth contact of the first bank of contacts is connected to ground so that relay 291 becomes energized to effect the presentation of start lever 309 in the path of the second subordinate stop lug 304, and disc 297 is arrested.

The fourth contact of the bank with which brush 276 co-operates is electrically connected to the fifth and seventh contacts of that bank and from the electrically connected contacts, a conductor 341 extends to one of the contacts of a pair of stepping or phasing contacts 342 (Fig. 11) associated with a master time transmitter indicated generally by the reference numeral 36, and shown in Figs. 8 and 11. Before proceeding with the description of the master time transmitter, it is worthwhile to note that the fourth contact in the third, fourth, fifth, and sixth banks is left free or dead. Thus, in the fourth position of brushes 277 to 281, inclusive, no circuits will be formed through those brushes. The fourth contact in the last bank of contacts in sequence switch 31 is connected by conductor 340 to one end of the winding of relay 201, the other end of which is connected to grounded battery 344. Since brush 282 is connected to ground, relay 201 will be energized upon the stepping of brush 282 into engagement with the fourth contact in the last bank of contacts. Relay 201 attracts its contact tongue 199 and in so doing interrupts the holding circuit for relay 197. The right-hand contact tongue 204 of relay 197, therefore, moves to its normal position out of engagement with the grounded front contact, whereby the relay 206 becomes de-energized. The relay 206 releases its contact tongues 208, 209, and 211, all of which move out of engagement with their front contacts. The contact tongues 208, 209, and 211 do not engage any back contacts. The contact tongue 208 interrupts the conductive paths comprising the conductors 333 and 334 over which the line identification signals were transmitted to the subscriber's station. This conductive path is at this time inactive since distributor 27 is not operating. The contact tongue 209 breaks the energizing circuit for relays 120 and 152 and for start magnet 236 of distributor 27, which circuit is energizable only in the first and second steps of brush 282. Movement of contact tongue 211 out of engagement with grounded front contact results in interruption of the circuit through conductors 317 and 318, winding of relay 316, conductor 319, brush 256 of finder switch 29, conductor 264 and winding of stepping magnet 266 for finder switch 29 to grounded battery 268. Thus, the stepping magnet 266 becomes de-energized and brushes 251 to 257, inclusive, are advanced to the next position. The line identifier apparatus and associated transmitter and finder await call by another link circuit.

Referring now to Fig. 8, the reference numeral 346 designates a shaft which has secured thereto a gear 347 which meshes with pinion 348 of a constantly operating motor 349. Motor 349 is driven from a time controlled source of alternating current and drives the shaft 346 at a rate of one-half revolution per second according to the preferred embodiment of the invention. Shaft 346 has secured thereto an intermittent motion transmitting device comprising a two-toothed gear 351 with which meshes an idler gear 352 having an even number of teeth. The faces of the teeth of gear 351 are indicated by reference numeral 353 in Figs. 8 and 10. The faces of the two teeth of gear 351 are full width, and the untoothed portion of the periphery of gear 351 is of two diameters, the right-hand portion as viewed in Fig. 8 being of full diameter, and the left-hand portion being of reduced diameter. Alternate teeth of idler 352 are of half width, the missing portions being in registry with the full diameter portion of gear 351. The cutaway portions of the teeth of idler 352 co-operate with the full diameter portion of gear 351 to provide a locking mechanism whereby idler gear 352 is prevented from rotating except through the agency of the two teeth of gear 351, and the reduced diameter portion of gear 351 accommodates the half width but full depth teeth of idler 352. A shaft 354 extending parallel to the shaft 346 has secured thereto a gear 356 preferably provided with twenty teeth. It will be apparent that for each revolution of shaft 346, which occurs in two seconds, the two teeth of the gear 351 will rotate idler 352 a distance of two teeth which will, in turn, rotate gear 356 carried by shaft 354 in the same direction as shaft 346 a distance of two teeth or one-tenth revolution.

Shaft 354 has secured thereto a sleeve 357 to which are secured five code discs 358 and an intermittent motion gear 359 similar to the intermittent motion gear 351 but having two teeth diametrically opposed. Code discs 358 are provided with code lugs and notches arranged in ten alignments representing the codes for the digits 0, 2, 4, 6, and 8 sequentially in duplicate. Thus, upon each revolution of gear 351 and specifically during an interval representing not more than 90° of revolution, the discs 358 are rotated one-tenth revolution to present a new alignment of code lugs and notches on the discs 358 to a predetermined code sensing position which will be identified later, the code presented successively to the sensing position representing units of seconds and specifically 0, 2, 4, 6, 8, twice for one revolution of sleeve 357.

An idler gear 361 meshes with and is operated by the intermittent motion gear 359, the idler gear 361 being rotated one tooth upon each one-half revolution of sleeve 357. Idler 361 has an even number of teeth and secured to it is an idler 362 meshing with a gear 363 secured to a sleeve 364 adjacent to sleeve 357 but sleeved on the shaft 354. Gear 363 has twelve teeth according to the preferred embodiment of the invention and is rotated one-twelfth revolution for each operation of idler 361 by one of the teeth of intermittent motion gear 359, or in other words for each one-half revolution of sleeve 357. Sleeve 364 has secured thereto five code discs having around the periphery thereof code notches and lugs to provide twelve alignments of codes representing the digits 0, 1, 2, 3, 4, 5, sequentially and in duplicate. The codes carried by the discs 366 represent two complete sequences of tens of seconds from 0 to 5, inclusive. Sleeve 364 has secured thereto an intermittent motion gear similar to the gear 359 and provided with two diametrically opposed teeth. Intermittent motion gear 367 meshes with an idler, which through an idler integral with it, rotates a gear 368 having ten teeth. For each one-half revolution of sleeve 364, one-tenth revolution is imparted to gear 368.

Gear 368 has secured thereto a sleeve 369 sleeved on shaft 354 and having five code discs 371 providing ten alignments of code notches and lugs representing the digits 0 to 9, inclusive. The alignments of code elements on code disc 371 represent units of minutes.

Sleeve 369 has secured thereto a single toothed intermittent motion gear 372 which, through idlers similar to those previously described, imparts intermittent motion to a gear 373 which is provided with twelve teeth. Gear 373 is advanced one tooth distance for each revolution of sleeve 369. Gear 373 has secured thereto a sleeve 374 which is identical with the sleeve 364 having code discs providing twelve alignments of code elements in duplicated series from 0 to 5, inclusive, representing tens of minutes in two complete sets. The intermittent motion gear 376 secured to sleeve 374 is a two-toothed gear having the teeth in diametrically opposed relation.

Two-toothed gear 376 drives intermittently through pinions similar to the pinions 361 and 362 a gear 377 which has twelve teeth. Secured to gear 377 is a sleeve 378 which carries five code discs 379. The code discs 379 provide twelve alignments of code elements which represent the digits 1, 2, 3, 4, 5, 6, 7, 8, 9, 0, 1, 2. The digits represented by these codes designate units of hours from 1 through 0, which represents 10, followed by 1 representing 11, and 2 representing 12. There is no 0 preceding the first-mentioned 1 because the next hour designation following 12 is 1. The sleeve 378 has secured thereto an intermittent motion gear 381 which is provided with three teeth nonuniformly spaced. The description of the stepping cycle of intermittent motion gear 381 will be deferred until after the apparatus which it drives has been described. Gear 381 intermittently drives idlers similar to the idlers 361 and 362 and through them imparts intermittent motion to a gear 382 to which is secured the sleeve 383 which carries two sets of code discs 384 and 386. The gear 382 has twelve teeth and the code discs 384 and 386 provide twelve alignments of two code combinations. The code combinations provided on the discs 384 represent blank and 1. The digit 1 is the only one required to represent tens of hours since it is not customary to employ a zero preceding a digit representing units of hours up to 9, and except in twenty-four systems of recording or computing time no digits higher than 1 are employed. The blank codes are used when the hour is represented by a single digit in the units position to fill the interval that would ordinarily be employed for transmitting a code representing tens of hours. The codes for blank and 1 are not arranged alternately around the code disc 384, but there are instead twice as many codes for the digit 1 as there are blanks and the arrangement of twelve codes is blank, 1, 1, in four sets. The reason for this uneven distribution of blanks and 1's is that they must bear a definite relation to codes representing A. M. and P. M. which are contained on the code discs 386.

In order to limit time signal transmission to essential characters, only codes for the letters A and P are contained on the code discs 386, these being sufficient to indicate whether a time designation is forenoon or afternoon. Having reference to the sequence of codes on the discs 384, beginning with blank in the first set, the corresponding codes on the discs 386 are A, A, P, P, P, A, A, A, P, P, P, A. It will be noted that the codes associated with the blank codes are alternately A, P, A, P. The reason for the irregular arrangement of codes for blank and 1 and for the letters A and P is that it provides a simple mechanism to step the code discs for the tens of hours and for the forenoon or afternoon designations from the intermittent motion gear associated with the code discs for the units of hours, since a code must be changed on the discs 386 while a code on the disc 384 remains the same. The reason for this is that time designations up to 11:59:58, which involves the figure 1 in the tens position, may be A. M., while those following 12, also involving the digit 1 in the tens of hours position, must be designated P. M. Thereafter all codes will be P. M. until 11:59:58, whereas after 12:00, the digit 1 remaining in the tens position, the designation must be restored to A. M. It has been found that this can be accomplished most simply by doubling the number of codes representing the digit 1 in the tens position of hours and operating the discs 384 when it is necessary to advance the discs 386, the code on the disc 384 which is advanced into effective position being the same as that which was advanced out of effective position. It will follow from this that sometimes the code discs 386 are advanced on account of an advancement of discs 384 when it is not necessary to change the forenoon or afternoon designation code which is in effective position, as in changing from 9:59:58 to 10:00. The repetition of the codes for the letters A and P in the sequence indicated provides for the advancement of the discs 386 without actually changing the code presented in effective position.

If it were not necessary to designate whether time representations pertain to forenoon or afternoon, it would be necessary for the intermittent motion gear 381 to step the code discs 384 only twice in each twelve hour period, one stepping operation occurring when the units of hours code discs 379 go from 9 to 0 to bring up the code for the digit 1 in the tens of hours positions to represent 10:00:00 o'clock and another when the code for the digit 2 on the discs 378 changes to 1 to represent a change from 12:59:58 to 1:00:00 o'clock, at which time the code on the tens of hours code discs 384 must be changed to blank. It is, however, necessary to provide for a third stepping of the code discs 384 from the intermittent motion gear 381 and this operation occurs as the discs 378 for units of hours change from 1 to 2 following 0 in order to reverse the code A or P, since the designation following the hour 12:00 must be different than the designation which preceded it. Accordingly, the three teeth on the intermittent motion gear 381 will be so positioned as to step the code discs 384 and 386 along with the advancement of the code discs 379 from 9 to 0, from 1 to 2, and from the same 2 to 1.

Since the codes on the disc 379 run from 1 through 9 to 0 and to 2, one twelve hour period is represented by those discs and, accordingly, the code discs 379 make one revolution per period of twelve hours. The twelve code combinations provided by the discs 384 and 386 represent four sets of codes, each set pertaining to a period of twelve hours. The four sets of codes on the disc 384 are identical but those carried by the disc 386 represent two pairs of sets, since a set for the forenoon time designation must differ from those of the afternoon time designation. It will be apparent from the foregoing that the code discs 384 and 386 make one-quarter revolution per revolution of the disc 379 or one-half revolution in twenty-four hours. It should be noted with reference to the forenoon and afternoon designations that since a change from the code for A to the code for P or the reverse occurs on the stepping of the discs from 11:59:58 to 12:00:58 at noon and again at midnight, which code is to be in effect during the next twelve hour period, the designations appearing with the 12:00:00 o'clock designations are at variance with familiar practices. Thus, the letter P will appear after 12:00:00 noon in order that the time indications throughout the next twelve hours shall be designated P. M., although 12:00:00 o'clock noon is usually referred to by the single letter M or possibly by the designation A. M. Similarly, 12:00:00 o'clock midnight will be accompanied by the code designation A, although 12:00:00 o'clock midnight is always referred to by the designation P. M. Thus, these designations are at variance with common practice for the two occurrences of 12:00:00 o'clock and require that operators shall become familiar with the fact that they are at variance with common practice. Mechanism of considerably greater complexity would be required to effect changing of the letter designating the twelve hour period at the first registered interval following 12:00, which would be two seconds after 12:00.

The code discs 358, 366, 371, 379, 384, and 386 have radially extending code lugs 387 and intervening notches by which they provide the code combinations (Fig. 11). Pivoted on a rod 388 extending parallel to the shaft 354 are code disc sensing levers 389 of which there is one for each of the code discs. There is a sixth lever 391 associated with each set of five sensing levers 389, the function of which is to control the transmission of start and stop impulses. Associated with each of the sets of five code sensing levers 389 and lever 391 is a bail 392 pivoted on the rod 388 and having a rod 393 extending between the arms of the bail and spanning the six levers 389 and 391. Rod 393 is disposed in the path of one arm of each of the levers 389 and 391, as shown in Fig. 11, so that as any one of the levers is rocked in counterclockwise direction by its biasing spring 394, its associated bail 392 will be rocked in counterclockwise direction. Associated with each of the bails 392 is a pair of contacts 396, which are normally open. When a bail 392 rocks into extreme counterclockwise position, it closes the contacts 396.

Each of the bails 392 controls a pair of contacts 396 identical with those shown in Fig. 11, and corresponding springs of each and the pairs of contacts are connected in parallel so that upon the closure of any pair, a relay 402 will be energized. Upon the energization of relay 402, its right-hand contact tongue which is connected to grounded battery 404 of the proper polarity to operate polarized relay 288 engages its front contact which is connected by conductor 403 to the fifth and seventh contacts of the third bank of contacts in sequence switch 31. The left-hand contact tongue of relay 402 is connected to ground and the front contact with which it co-operates is connected by conductor 406 to the fifth and seventh contacts of the sixth contact bank of sequence switch 31.

Continuously rotatable timed shaft 346 has secured thereto a plurality of transmitting cams, there being a cam 398 for each of the transmitting contact levers 389 and a transmitting cam 399 for each of the start and stop signal levers 391. Each transmitting cam 398 of a set of five transmitting cams is provided with a notch in the periphery thereof which, upon passing the lower end of its associated transmitting contact lever 389, frees that lever for counterclockwise rotation and the lever will be rocked counterclockwise by its spring 394 unless it is blocked by a code lug of its associated time signal code disc. The rocking of the lever 389 results in operation of the contacts 396, which represents a spacing condition because a marking condition must be represented by open contacts since the contacts are in parallel. The code projections on the time signal code discs represent marking impulses in that they prevent the operation of a transmitting contact lever 389 for generating a spacing impulse.

Each of the transmitting cams 389 is provided with a notch for permitting the operation of the associated transmitting contact lever 391 and thus closure of contacts 396 for effecting the transmission of a start impulse. The start impulse notch of a cam 399 follows at a sufficient distance the notch of the cam 398 preceding it so that preceding the transmission of a start signal, the cam disc 399 will hold its lever 391 in extreme clockwise position for the transmission of a stop or rest impulse. Thereafter, the five discs 398 associated with it release their levers 389 in succession. After the notch of the last of a set of five cam discs 398 has released and restored its contact 389, the start and stop signal transmission cam of the next set presents its notch to its associated lever 391 after an interval sufficient for the stop signal for the transmission of a start impulse.

The preferred order of transmission of signals from the master time transmitter is tens of hours, units of hours, tens of minutes, units of minutes, tens of seconds, units of seconds, and finally the designation A or P to indicate that the time is forenoon or afternoon. Accordingly, the notches in the transmitting cams are generally in the arrangement of the spiral around the set of cams beginning with the second set of cams from the right (Fig. 8) and extending leftwardly. Since the last case shift signal stored in the register 32 or transmitter to the subscriber's stations 21 and 24 was a letter shift signal derived from the eighth, ninth, tenth, eleventh, and twelfth segments from the bottom in the row of segments at the right of transmitting distributor 27, it is necessary to generate in the master time transmitter a figures shift signal to be transmitted before the code combination representing tens of hours. Likewise, after the signal representing units of seconds has been transmitted, it is necessary to generate and transmit a letters shift signal before the forenoon or afternoon designation signal may be transmitted by the set of cams at the right of the master time transmitter. The six actual time signal combinations, the forenoon or afternoon designation signal, and the shift and unshift signals make a total of nine signal combinations to be transmitted from the master time transmitter. Since the transmission of intermittent motion to shaft 354 is effected in approximately one-quarter revolution of shaft 346, as indicated in Fig. 10, the remaining three-quarters of a revolution may be allotted to the transmission of signal combinations by the cams carried by shaft 346. Shaft 346 makes three-quarters of a revolution in one and one-half seconds and transmits in that interval nine code combinations which is at the rate of six code combinations per second or three hundred sixty code combinations per minute, which is a standard operating speed for printing telegraph apparatus. Accordingly, the nine code combinations to be transmitted may be distributed uniformly around three-fourths of the periphery of the transmitting cam assembly.

The notches for the shift and unshift code combinations may be cut on one of the start-stop impulse transmitting discs, such as the disc 399 at the extreme right of the master time transmitter and this arrangement has been indicated in Fig. 11. It is only necessary that the notches pertaining to one signal combination shall be confined to one-twelfth of the circumference of the disc, that they shall be in the proper angular position with reference to the sequences of notches in the other sets of signal transmitting cams, and it follows from this that the spiral succession of notches will be interrupted in the angular positions where an entire code combination is contained on the right-hand disc 399.

The previously identified contacts 342 are controlled by a cam 416 secured to shaft 346 and having a single apex. The cam 416 closes contacts 342 through the operation of contact controlling lever 417 momentarily just before the shift code combination of notches in the extreme right-hand disc 399 approach their associated transmitting contact lever 391.

The contacts 342 time the stepping of sequence switch 31 from the fourth to the fifth contacts by completing a circuit from ground through conductor 341, the fourth contact of the second bank of contacts in the sequence switch 31, brush 276, winding of stepping magnet 283 to grounded battery 286. Contacts 342 are closed only momentarily and as soon as they are opened, brushes 275 to 282, inclusive, are stepped to engage the fifth contacts of their respective contact banks. In the first contact bank the fifth contact is left unconnected, so that the circuit of relay 291 is released, and start magnet 306 releases its armature lever 309, whereby disc 297 starts to rotate. At the fifth contact, brush 276 is also connected to conductor 341 but since the energizing circuit for the stepping magnet is open due to the fact that contacts 342 have reopened, the brushes remain in this position. At the fifth contact of the third bank of contacts, a circuit for the storing register controlling relay 288 is prepared through conductor 403 to the right-hand front contact of relay 402. Almost immediately after the opening of contacts 342, the transmitting cams 399 and 398 advance into position to control the relay 402 and throughout the next three-quarters revolution of shaft 346, the relay 402 is controlled in accordance with the shift signal, hours, minutes, and seconds signals, the unshift signal, and the forenoon or afternoon designation signal. Relay 402 follows the operation of the contact 396 in accordance with the signals and operates its right-hand contact tongue according to marking and spacing signals, thereby controlling the contact tongue of polarized relay 288 to register on the magnetic storing register disc 297. Following the transmission of the A. M. or P. M. identification signal, cam 416 again closes contacts 342 to connect ground through the contacts and through conductor 341 and the fifth contact of the second bank of contacts of sequence switch 31 through brush 276 and winding of stepping magnet 283 to grounded battery 286, whereby the stepping magnet becomes energized and as contacts 342 reopen, the magnet becomes de-energized to step the brushes 275 to 282, inclusive, to engagement with the sixth contact in each of the contact banks.

The master time transmitter shown in Figs. 8, 10, and 11 has connected to it in multiple other message register controlling sequence switches, such as the switch 31, and is arranged to broadcast the time signals to as many message storing registers as may become associated with the master time transmitter through the sequence switch of the message storing register.

The operation of the left-hand contact tongue of relay 402 upon the beginning of transmission of time signals, as set forth in the foregoing description, resulted in the completion of a circuit from ground through the left-hand contact tongue of relay 402, conductor 406, fifth contact of the sixth bank of contacts in sequence switch 31, sixth brush 281, line 293, fifth brush 279, fifth contact in the fifth bank of contacts, conductor 421, and winding of relay 137 to grounded battery 422. Upon the energization of relay 137, its contact tongue connects to conductor 1480 and the left-hand winding of differential relay 132 the grounded battery 423 instead of the battery 139. Since the circuit of conductor 1480 extends through line conductor 172 to subscriber's station 24 and the circuit of the left-hand winding of relay 132 extends through conductor 136 and line conductor 69 to the subscriber's station 21 and since the left-hand contact tongue of relay 402 and, therefore, the contact tongue of relay 137 follow the signals generated by the master time transmitter, the time signals are transmitted to the subscriber's stations 21 and 24 and are recorded at those stations.

Upon the stepping of brushes of the sequence switch 31 to engagement with their sixth contacts, a number of circuit changes occur. The sixth contact of the first bank is connected to ground and thus a circuit is completed from the ground through brush 275, conductor 285, winding of relay 291 to grounded battery 295, whereby relay 291 becomes energized and completes the energizing circuit of start and stop magnet 306 which holds its armature lever 309 in the path of the third of the subordinate stops 304, thus arresting the magnetic recording disc 297. In the second bank of contacts, the sixth contact is connected by conductor 424 to the front contact of a relay 426. One end of the winding of relay 426 is connected to grounded battery 427 and the other end of the winding is connected by conductor 428 to the front contact of relay 132. The contact tongue of relay 132 is not at this time attracted because the windings of that relay are energized in opposition. Thus, relay 426 is not energized and the circuit traced to its front contact is open at that point, the return circuit being traceable from the contact tongue through conductor 429 to the fourth, fifth, and seventh contacts of the same sequence switch bank and also to conductor 341. None of the other contact banks has connections to their sixth contacts and, therefore, no other circuits are completed or prepared through the brushes 277 to 282, inclusive.

All of the accounting information required previous to the transmission of the messages between subscribers' stations 21 and 24 has been stored in the storing register 32 and has been transmitted to the subscribers' stations. The receipt by the subscribers of the record of the time of establishment of the communication circuit indicates to the subscriber at station 21 that he may proceed to transmit message material to the subscriber at station 24. The subscribers at stations 21 and 24 may communicate back and forth between their respective transmitters and receiving printers without in any way affecting the supervisory and control relays at the central office. Such communication is accomplished by operation of the subscribers' transmitters to open and close their signaling loops according to permutation signals. Marking signals are represented by co-operating batteries at both ends of the loops. Spacing signals are represented by an open loop at a transmitting station and by opposing batteries at both ends of the loop to the receiving station, so that the marking and spacing signals are current and no-current conditions, respectively. The two windings of relay 132 are simultaneously energized or de-energized and the relay does not operate its contact tongue during message transmission between the subscribers' stations.

At the conclusion of message transmission between stations 21 and 24, the subscriber at station 21 depresses key 48, thereby disconnecting line conductor 47 from line conductor 69 at station 21 and connecting ground through operating winding of line relay 46 and through line conductor 47, line finder 112, conductors 122 and 127, operating winding of repeater relay 128, contact tongue 129 of repeater relay 130, conductor 131, right-hand winding of relay 132 to grounded battery 133. Since the line circuit 69 is left unconnected at the key 48, current in the left-hand winding of relay 132 ceases so that the left-hand winding no longer opposes the right-hand winding and relay 132 attracts its contact tongue to complete the energizing circuit for a slow-to-release relay 426 which attracts its contact tongue, thus preparing a circuit for the energization of stepping magnet 283. This circuit extends from grounded battery 286 through winding of stepping magnet 283, brush 276, conductor 424, contact tongue and front contact of relay 426, conductor 429, conductor 341 to contacts 342 of master time transmitter 36 and when cam 416 closes and then reopens contacts 342, brushes 275 to 282, inclusive, will be stepped to the seventh contacts of their respective banks. From this it will be apparent that the operation of key 48 by the subscriber at station 21 need be only momentary as the relay 426 maintains the circuit for stepping magnet 283, and the brushes 275 to 282 will be stepped within two seconds under the control of cam 416, whereupon the circuit, including conductors 424 and 429, is no longer needed and after momentary closure key 48 may be restored to normal to release relay 426 and to restore the line conductors 487 and 69 to signal receiving condition.

The stepping of brushes 275 to 282, inclusive, upon operation of contact 342 advances the brushes to engagement with the seventh bank contacts. The circuits completed through the brushes and the seventh contacts are identical with those completed through the brushes and the fifth contacts previously described, from which it will be apparent that armature lever 309 of magnetic storing register start-stop magnet 306 is released to permit rotation of disc 297 and the repeater relay contacts associated with the master time transmitter will be connected to the polarized relay 288 of the magnetic storing register and to the relay 137 by which the time signals may be transmitted to the subscriber's stations 21 and 24. Thus, signals representing the time when subscriber at station 21 operates key 48 to indicate that communication has been completed and that he is prepared to be disconnected from the subscriber's station 24 is stored in the magnetic storing register and is transmitted to the subscribers.

Following the transmission of the time signals, cam 416 again operates contacts 342 to operate stepping magnet 283 to advance the brushes 275 to 282, inclusive, to the eighth contacts of the contact banks. In order to register the time signals transmitted through the seventh contacts of the contact banks, the start magnet armature lever 309 of the storing register permitted the last of the subordinate stop lugs 304 to escape. The storing of the time signals completes the storing of signals in magnetic disc 297 and the disc approaches the position from which it started to store signals. Arrestment of the disc in this position necessitates that the magnet 306 shall be de-energized, since the principal stop lug 303 is at a lesser radial distance from the axis of shaft 296 than the subordinate stop lugs 304. To this end, the magnet 306 must remain de-energized as the brush 275 moves into engagement with the eighth contact of the first bank and accordingly, the eighth contact is dead. The eighth contact of the second bank is also dead so that a circuit for stepping the brushes to the ninth contacts will not be completed through brush 276. The eighth contacts of the third and fourth banks are dead but the eighth contact of the fifth contact bank is connected to stepping magnet conductor 313 and the eighth contact of the sixth bank is connected by a conductor 431 to the contact tongue of a relay 432 which at this time is de-energized so that its contact tongue does not engage the grounded front contact, and the prepared stepping circuit for magnet 283 is not completed. A circuit is completed from ground through brush 282, eighth contact of the seventh bank, conductor 433, and winding of relay 434 to grounded battery 436. Relay 434 has two contact tongues, both of which are connected to ground. The front contact with which the left-hand contact tongue cooperates is connected by conductor 437 to one end of the winding of a start relay 438 for a recorder finder switch indicated generally by the reference numeral 439 (Fig. 9). The right-hand contact tongue of relay 434 prepares an energizing circuit for relay 432 from the ground at the contact tongue through conductor 441, winding of relay 432, conductor 442 to the fourth contact of the first bank of contacts of sequence switch 439 (Fig. 9).

Relay 438 upon being energized attracts its grounded contact tongue into engagement with its front contact which is connected by conductor 443 to the back contact of stepping magnet 444, the interrupter contact tongue of which is connected to one end of the winding of the stepping magnet. The other end of the winding of stepping magnet 444 is connected to grounded battery 446. The winding of stepping magnet 444 is also connected by conductor 447 to brush 448 associated with the first bank of contacts of finder switch 439.

The immediate energization of relay 438 upon the energization of relay 434 results in the completion of a self interrupting stepping magnet energizing circuit whereby magnet 444 steps the finder switch brushes 448, 449, and 451 until brush 448 moves into engagement with its fourth contact. Brush 448 completes the energizing circuit for relay 432 through a direct energizing circuit for stepping magnet 444 in shunt with its interrupting contact tongue and back contact, so that the stepping magnet does not become released nor step the brushes 448, 449, and 451 to the next position, but remains energized and the brushes remain in engagement with the fourth contacts in their respective contact banks.

The attraction of the contact tongue of relay 432 upon energization of that relay completes the energizing circuit for stepping magnet 283 of sequence switch 31 through its interrupter contact tongue 284 so that the stepping magnet 283 becomes energized and immediately de-energized, thus stepping the brushes 275 to 282, inclusive, to engagement with the ninth contacts in their respective contact banks. New circuit connections are thus established in the sequence switch 31.

The ninth contact of the first bank is connected to ground so that the relay 291 will be energized and as a result start magnet 306 will be energized to release disc 297 for rotation. In order to provide that the disc 297 will make but one revolution and come to rest so that a second retransmitting cycle of disc 297 will not be started it is desirable to open the circuit of relay 291 after disc 297 has started to rotate. If this is not done disc 297, which must complete a revolution to transmit all of the stored signals before the connection to the retransmission circuit is broken, may not be arrested at the end of one revolution, but may continue into a second revolution. The interruption of the circuit of relay 291 is accomplished by stepping the sequence switches to their tenth contacts and having the tenth contact in the first bank dead. Accordingly the ninth contact of the second bank is connected by conductor 452 to one of a pair of normally open contacts 453, the other of which is connected to ground. Contacts 453 are arranged to be closed momentarily by a cam projection 454 on disc 297 just after the disc begins to rotate, and the closure of the contacts results in completion of the circuit of stepping magnet 283 to effect stepping of the brushes.

The ninth and also the tenth contacts of the third contact bank in sequence switch 31 are connected to grounded battery 456, the polarity of which with respect to the connection to the ninth and tenth contacts of the contact bank is the reverse of that which the second and third contacts receive over conductor 323 from the battery at the left-hand contact tongue 247 of relay 246 (Fig. 4) or which the fifth and seventh contacts of the contact bank receive over conductor 403 from battery 404 connected to the right-hand contact tongue of signal repeating relay 402 associated with the master time transmitter 343. The effect of connection of battery 456 through brush 277 to the windings of polarized relays 288 and 289 is to hold the contact tongue of relay 288 in the idle condition which is the condition shown in Fig. 5 and to move the contact tongue of relay 289 into engagement with its lower contact tongue for the first time in the operation of the system.

The lower contact tongue of polarized relay 289 is connected by conductor 292 to the brush 278 associated with the fourth contact bank of sequence switch 31. All of the contacts which the brush 278 have traversed up to this point have been dead, but the ninth contact is connected by conductor 458 to the input of an amplifier and rectifier, indicated schematically at 463, for rectifying spacing signals retransmitted from the magnetic storing register 32. The rectifier controls a relay 465 which is energized when the rectifier is responding to marking signals to connect ground through its contact tongue and through conductor 4580 to the fourth contact of the third contact bank of finder switch 439 (Fig. 9). This is the bank with which brush 451 cooperates and the brush 451 is connected by conductor 459 to one end of the winding of relay 461, the other end of which is connected to grounded battery 462.

The function of the circuit established through the brush 278 of sequence switch 31 to amplifier and rectifier 463 and through relays 465 and 461 is to communicate permutation code signals corresponding to those stored in the magnetic disc 297 to a permutation code printer. Since such printers are operable upon direct current, whereas the signals were impressed upon disc 297 by magnet 301 were energized by alternating current and will be regenerated in alternating current form in the magnet 301 due to the rotation of magnetized disc 297 past the poles 299 of magnet 301, it is necessary to amplify and rectify these permutation code combinations of trains of alternating current. Furthermore, since the rectifier is activated in response to spacing signals and is idle in response to marking signals, conductor 4580 is connected to the bank contact of relay 465. When relay 461 is energized in response to a marking signal from relay 465, it attracts its contact tongue into engagement with a front contact which is connected by conductor 464 to one end of the winding of relay 466, the other end of which is connected to grounded battery 467. Relay 466 is of the slow-to-release type so that it will not attract and release its contact tongues in response to the oscillation of the contact tongue of relay 461, which follows the permutation code signals received over conductor 459, but will hold its contact tongues as the contact tongue of relay 461 follows the signals and will release its contact tongues only after relay 461 has remained deenergized for a predetermined interval.

There is a back contact with which the contact tongue of relay 461 is normally engaged and the back contact is connected by conductor 468 to one end of the winding of a slow release relay 469, the other end of which is connected to grounded battery 471. When the apparatus is idle, relay 469 is energized and holds its contact tongue out of engagement with its back contact. The back contact of relay 469 is connected by conductor 472 to the right-hand contact tongue of relay 466. The front contact with which the right-hand contact tongue of relay 466 cooperates is connected to ground so that when relay 461 is following permutation code signals, the right-hand contact tongue of relay 466 will be held and ground will be connected continuously to the back contact of relay 469.

Relay 469 is also slow to release so that it will not release its contact tongue until after a predetermined interval of steady energization of relay 461.

The contact tongue of relay 469 is connected by conductor 473 to brush 449 of finder switch 439. The fourth contact of the second bank of contacts of finder switch 439 is connected by conductor 474 to the tenth contact of the sixth bank of contacts in sequence switch 31. This contact is the one which will next be engaged by brush 281 from which a conductive path extends through conductor 293, brush 279 of the fifth bank of contacts in sequence switch 31, tenth contact of the fifth bank, conductor 313, conductor 312, interrupter contact and winding of stepping magnet 283 to grounded battery 286. It will be apparent that an energizing circuit for the stepping magnet 283 will be completed from the grounded front contact of relay 466 (Fig. 9), when relay 461 has been energized steadily for a predetermined interval to permit relay 469 to become de-energized and release its contact tongue for completing this energizing circuit. The condition under which relay 461 remains energized for the predetermined interval will be described hereinafter.

As previously set forth, the ninth contact of the seventh contact bank in sequence switch 31 is connected to the eighth contact, and thus ground continues to be connected through brush 282, conductor 433, and winding of relay 434 to hold its right-hand contact tongue, whereby the energizing circuit for relay 432 (Fig. 5) and for the stepping magnet 444 of sequence switch 439 (Fig. 5) is maintained energized.

The left-hand contact tongue of the slow-to-release relay 466 is connected by conductor 476 to conductor 464 which, in turn, is connected to the front contact of relay 461 so that the contact tongue of relay 466 is connected to ground when relay 461 is energized. A front make-before-break contact which is engaged by the left-hand contact tongue of relay 466 when the relay is energized is connected by conductor 477 to one end of the winding of the selector magnet 478 for a receiving printer. The other end of the winding of the selector magnet is connected to grounded battery 479. The fixed contact with which the make-before-break front contact cooperates is connected to ground. Thus, when relay 466 is deenergized, holding current for the selector magnet 478 flows from grounded battery 479 through the selector magnet and through conductor 477, fixed contact and movable front contact of relay 466 to ground. When relay 466 becomes energized, the holding circuit for selector magnet 478 is maintained from grounded battery 479 through the winding of the selector magnet, conductor 477, movable front contact which is engaged by contact tongue of relay 466 before being disengaged from the fixed grounded contact, conductors 476 and 464 to the front contact of relay 461 which is engaged by its grounded contact tongue.

The circuits are now complete for the retransmission of the signals stored in disc 297 to the printer selector magnet 478. At the beginning before disc 297 begins to rotate, no current is generated in the magnet 301 because relative motion between disc 297 and magnet poles 299 is necessary to generate current in the combined recording and pick-up magnet 301. Thus, no alternating current will be applied through conductor 458 to rectifier 463, and the arrangement of that rectifier and amplifier is such that the relay 465 is deenergized and applies ground to conductor 4580 and thus to the winding of relay 461.

Immediately after disc 297 starts to rotate, cam projection 454 closes contacts 453 and the stepping magnet 283 is operated to advance brushes 275 to 282 to their tenth contacts.

In the first and second banks of contacts, the tenth contacts are dead so that no circuits are completed through the brushes 275 and 276. In the third bank of contacts, the tenth contact is connected to the ninth so that battery 456 remains connected to the windings of polarized relays 288 and 289 and the condition of these relays remains unchanged. In the fourth bank of contacts, the tenth contact is connected to the ninth so that the permutation code transmitting circuit from rectifier and repeater 463 through brush 278 and conductor 458 is not disturbed. In the fifth bank, the tenth contact is connected to conductor 313 from which the conductor 312 extends to the winding of stepping magnet 283, as previously set forth, and the tenth contact of the sixth contact bank is connected by conductor 474 to the fourth contact of the second contact bank of sequence switch 439, also as previously set forth. The tenth contact of the seventh contact bank of sequence switch 31 is dead.

As disc 297 rotates, the magnetized portions thereof induce alternating current in the winding of magnet 301 and the unmagnetized portions induce no current in the magnet. As previously set forth, the magnetized portions represent spacing impulses and the unmagnetized portions represent marking impulses. For each marking impulse, the rectifier and repeater 463 connects ground through conductor 4580 to energize relay 461 (Fig. 9) and for each spacing impulse, the circuit of relay 461 is opened. When the disc 297 has completed a full revolution and has come to rest, all of the signals stored therein representing the identity of the called subscriber, the identity of the calling subscriber, the time of initiation of communication, and the time of termination of communication have been retransmitted to relay 461 which repeats the signals into the selector magnet 478 of a receiving printer.

As disc 297 remains at rest upon completion of the retransmission of the signals, no current is generated in magnet 301 and as this represents a marking condition, the relay 461 remains energized. Its contact tongue is thus held steadily out of connection with conductor 468 over which relay 469 receives energizing current. Relay 466 also remains energized since its energizing circuit is completed by the contact tongue of relay 461, and the right-hand contact tongue of relay 466 remains engaged with its grounded front contact. As previously set forth, relay 469 is slow to release and after a predetermined interval, it releases its contact tongue, thus completing a circuit from the ground at the right-hand front contact of relay 466 through the contact tongue, conductor 472, back contact and contact tongue of relay 469, conductor 473, brush 449 of finder switch 439, fourth contact of the middle bank of contacts, conductor 474, tenth contact of the sixth bank of contacts in sequence switch 31 (Fig. 5), brush 281, conductor 293, brush 279, tenth contact of the fifth bank of contacts in sequence switch 31, conductors 313 and 312, interrupter contact tongue 284 and winding of stepping magnet 283 to grounded battery 286. Stepping magnet 283 thus becomes energized and immediately deenergized due to the attraction of its interrupter contact tongue and brushes 275 to 282, inclusive, are stepped into engagement with the eleventh contacts in their respective contact banks.

The eleventh contact in the first contact bank is connected to ground so that the relay 291 again becomes energized and closes the starting magnet circuit for magnetic storing register 32, whereby the disc 297 is again released for rotation. The eleventh contact of the second bank is connected by conductor 486 to one contact of a normally open pair of contacts 487, Fig. 11, the other of which is connected to ground. Contacts 487 are impulsing contacts and are actuated by a cam 488 secured to a continuously rotatable shaft 489. Shaft 489 also has secured thereto a code transmitting cam 491 which has cut in the periphery thereof permutation codes for sending a motor stop signal. Since the motor stop function of printing telegraph receiving apparatus is sometimes controlled by the code combination for the letter H preceded by a shift code combination the code transmitting cam may have cut in the periphery thereof the code for shift followed by the code for the letter H and following this, the unshift code to restore the receiving printer to unshift selective condition. Code transmitting cam 491 controls a cam follower lever 492 which, in turn, controls transmitting contacts 493. Contacts 493 open when lever 492 is in extreme counterclockwise position and close when lever 492 rocks into extreme clockwise position by dropping into notches in the code transmitting cam 491. One of the contacts of the contact pair 493 is connected to ground and the other is connected by conductor 494 to the twelfth contact in the sixth bank of contacts in sequence switch 31.

It will be apparent that when cam 488 closes contacts 487, the energizing circuit of stepping magnet 283 will be completed through conductor 486, eleventh contact of the second bank of contacts, and brush 276 to effect stepping of the brushes 275 to 282, inclusive. It will be assumed that cam 488 has not yet closed the contacts 487 so that the brushes remain in engagement with the eleventh contacts.

The eleventh contact of the third bank of contacts is connected to the grounded battery 456 as is also the twelfth contact of the bank in order to maintain magnet 301 for the magnetic storing register connected through the contact tongue and lower contact of polarized relay 289 to conductor 292. The reason for also connecting the twelfth contact to battery 456 is that contacts 487 may operate at random with respect to the stepping of the brushes 275 to 282, inclusive, into engagement with the eleventh contacts, to again step them and into engagement with the twelfth contacts. The disc 297 will not have completed a revolution at this time and therefore it is necessary to provide for continued connection of battery 456 to the winding of polarized relay 289 after the brushes have been stepped to the twelfth contacts. The eleventh and twelfth contacts of the fourth bank of contacts of sequence switch 31 are connected through adjustable resistance 495 and battery 496 so that while disc 297 rotates, and regardless of when brush 278 is stepped from the eleventh to the twelfth position, direct current will be applied through adjustable resistance 495, brush 278, conductor 292 and contact tongue of polarized relay 289 to the winding of magnet 301. Battery 496 is connected to produce reverse magnetization in the core of magnet 301 to that previously afforded by battery 310, so that the stored record will be obliterated. The eleventh contacts of the fifth, sixth, and seventh banks of the sequence switch 31 are dead, so that no circuits will be completed through them in the eleventh position of the brushes 279, 281, and 282.

As disc 297 rotates, the signals will be erased therefrom by the uniform reverse magnetization of the disc, and upon the operation of contacts 487 by cam 488, at random with respect to the rotation of disc 297 stepping magnet 283 will be energized momentarily to step the brushes 275 to 282, inclusive, into engagement with the twelfth contact of the respective banks of contacts.

The twelfth contact of the first bank is dead so that no conductive circuit will be completed through the relay 291, which, remaining deenergized, will not complete the energizing circuit for start magnet 306 of magnetic storing register 32, so that armature lever 309 of magnet 306 will remain in position to arrest disc 297 at the conclusion of a revolution. The twelfth contact of the second bank of contacts is connected to conductor 452 in preparation for stepping of the sequence switch brushes upon completion of the erasure of the stored signals in disc 297. No change occurs in the circuit connections through the third and fourth brushes 277 and 278 and therefore polarized relay 289 remains operated and battery remains connected to magnet 301 of the magnetic storing register. The twelfth contact of the fifth bank is connected by conductor 421 to the winding of relay 137 so that a conductive path will be completed through brush 279, conductor 293, and brush 281 to the twelfth contact of the sixth bank which, as previously stated, is connected by conductor 494 to the contact 493 for transmitting a motor stop signal. The twelfth contact of the seventh contact bank is dead so that no circuit is completed through the brush 282. While the brushes are engaging the twelfth contact, the transmitting contacts 493 (Fig. 11) transmit permutation code signals over a previously identified circuit to operate the relay 137 (Fig. 2). Relay 137 repeats these signals into the line conductors 69 and 172 in the same manner that it repeated the time signals, by being energized for spacing impulses and deenergized for marking impulses.

At each of the subscribers' stations 21 and 24, the motor stop signal causes the operation of a pull bar to open normally closed contacts 184. One of the contacts 184 is connected to ground and the other is connected by conductor 183 to the lower front contact of relay 53 which at this time, is engaged by contact tongue 179 through which the holding circuit for relay 53 has been maintained. Thus, the relay 53 is released and grounded battery 56 is disconnected from conductor 52 whereby relays 51 and 57 are released, motor 43 is stopped and the biasing winding of line relay 46 is deenergized, thus restoring station 24 to normal. Relay 51 releases its contact tongue 50, thus disconnecting line conductor 69 from line conductor 47 at the subscriber's station 21 and connecting ground to line conductor 69 through contact tongue 50 of relay 51, conductor 62, upper contact tongue 64 of key 66 and winding of polar relay 68. This ground at the contact tongue 50 of relay 51 completes the circuit for releasing apparatus fully disclosed in the hereinbefore identified Singer patent which operates to effect the release of relay 162 and the disconnection of ground from the dotted line circuit 118 which is a branch circuit from conductor 117. The holding circuit for relay 89 is interrupted by the disconnection of ground from the branch circuit 118 and the relay becomes deenergized and releases its contact tongues. The release of relay 162 results in the opening of the series circuit which includes relays 164 and 158 and thus the relay 158 becomes deenergized and releases its contact tongues. Since relays 89 and 158 are deenergized, the holding circuits for the line finders 112 and 147 are released and these line finders return to normal condition. Since the line conductors 47 and 171 were disconnected and thus open at the subscribers' stations 21 and 24, the repeater mechanism at the central office returns to normal. In short, the communication conductors for the subscribers' stations 21 and 24 becomes disconnected from the link circuit and supervisory apparatus at the central office and all of the supervisory apparatus returns to normal.

The speed of rotation of motor stop signal transmitting cam 491 is much faster than that of disc 297, since cam 491 accommodates only three permutation code signal combinations, whereas the disc 297 accommodates thirty or more. Thus cam 491, rotating continuously, transmits several sets of motor stop signals while the signals are being deleted from disc 297, but the extra motor stop signals will have no undesirable effect. Just before the disc 297 comes to rest, contacts 453 are closed to connect ground through the contacts and through conductor 452, twelfth contact and brush 276 of the second bank of contacts, winding of stepping magnet 283 to grounded battery 286. Thus the brushes 275 to 282 will be stepped to engagement with the thirteenth contacts in the banks. The seventh or last contact bank is the only one which has any conductive connection to its thirteenth contact and this contact is connected to all of the remaining contacts in the seventh bank and to conductor 312 which extends through the interrupter contact tongue and through the winding of stepping magnet 283 to grounded battery 286. The connection of the remaining contacts in the seventh bank to conductor 312 establishes a homing circuit for the stepping magnet 283. The magnet becomes energized, interrupts its own energizing circuit through its interrupter contact tongue 284, and steps the brushes. The magnet is again energized, interrupts its energizing circuit, and steps the brushes. This continues until brushes 275 to 282 have been restored to their original positions, engaging the first contact of each bank. As the first contacts of all of the banks are free except those in the fifth and sixth banks, the brushes will remain at rest until the relay 316 is again energized under the control of storing register selector sequence switch 29 and an energizing circuit for stepping magnet 286 is completed through brushes 279 and 281 as previously described.

A mechanical signal storing device which may be employed instead of the magnetic storing register of Figs. 5 and 6 is shown in Figs. 7 and 15. Referring to those figures, the reference numeral 501 designates the continuously rotatable shaft of a sword and T-lever type receiving selector mechanism such as that shown in Patent 1,745,633 granted February 4, 1930, to S. Morton et al., and Patent 1,904,164 granted April 18, 1933, to S. Morton et al. Shaft 501 carries a receiving selector cam assembly 502 to which rotation may be imparted from the shaft through friction discs 503 under compression by spring 504. Cam assembly 502 has secured thereto a stop arm 506 in the path of which is a rockable stop gate 507 which is locked in position to arrest stop arm 506 when a receiving selector magnet 508 is energized, and which becomes unlocked when selector magnet 508 is deenergized to permit stop arm 506 and thus receiving selector cam assembly 502 to escape for rotation. The manner in which stop gate 507 is controlled and in turn controls the release and arrestment of selector cam assembly 502 is fully disclosed in the patents to S. Morton et al. It is considered sufficient to state here that selector magnet 508 is responsive to start-stop permutation code signal combinations and that such code combinations are preceded by a start impulse of spacing or no current nature whereby magnet 508 becomes deenergized and unlocks stop gate 507 so that selector cam assembly 502 is released for rotation. At the end of a code combination a stop signal of marking or current nature is received by the selector magnet 508 just before the selector cam assembly 502 has completed one revolution and the selector magnet becomes energized and locks the stop gate 507 so that stop arm 506 encounters locked stop gate 507 and selector cam assembly 502 is arrested.

As shown in Fig. 15, selector magnet 508 has an armature 509 which is carried by a selector lever 511 pivoted at 512. Armature 509 and selector lever 511 are biased by spring 513 into unoperated or spacing position.

Selector cam assembly 502 is provided with a plurality of selector cam projections 514 arranged spirally around cam assembly 502. In alignment with the cam projections 514 are sword lever operating bell cranks 516 which are pivoted one above the other at 517 and are biased in clockwise direction as viewed in Fig. 15 by individual tension springs 518. A reciprocable sword lever 519 is articulated to each of the bell cranks 516 for limited pivotal movement in the plane of the associated bell crank 516. Each sword lever 519 is provided with oppositely extending arms 521 which terminate in abutments presented toward the free end of selector lever 511. As is fully disclosed in the patent to S. Morton et al., selector lever 511 is provided at its free end with depending arms slightly closer together than the abutments of the sword levers so that one of the depending arms will be in alignment with one set of abutments of the sword levers when selector lever 511 is in extreme counterclockwise or marking position and the other depending arm of selector lever 511 will be in alignment with the other set of abutments of the sword levers 519 when the selector lever is in extreme clockwise or spacing position. Any sword lever which is reciprocated rightwardly as viewed in Fig. 15 at the time that selector lever 511 is in extreme counterclockwise position will be rocked in clockwise direction due to interference of the upper depending arm of selector lever 511 as viewed in Fig. 15 with the upper abutment of the sword lever. Conversely, any sword lever which is reciprocated rightwardly as viewed in Fig. 15 when the selector lever 511 is in extreme clockwise or spacing position, will be rocked to extreme counterclockwise position. Thus as selector cam assembly 502 is rotated and sword lever bell cranks 516 are operated successively, the sword levers 519 are reciprocated rightwardly successively and those which encounter interference by the selector lever 511 have their free ends rocked from one side to the other of a post 522 which pivotally supports a plurality of T-levers 523 equal in number to and aligned with the sword levers 519. Each of the T-levers 523 has an arm 524 which terminates in a laterally extending abutment 526.

As shown in Fig. 7, the abutments 526 of the T-levers provide deflector surfaces which may be seen on the underside of the abutments as identified by the reference numeral 527. When a T-lever 523 is in extreme clockwise or spacing position, its deflector shaped abutment 526 just clears the free ends of flexible radial fingers 531 of a disc 532 carried by a rotatable shaft 533. There is a disc 532 with radially extending fingers 531 in approximate alignment with each of the T-levers 523 and the assembly of disc 532 receives rotation from shaft 533 through friction clutches 534 under compression by spring 536. When a T-lever 523 is rocked into extreme counterclockwise or marking position, its abutment 526 blocks the path of a finger 531 of the disc 532 in alignment with it, and the deflector surface 527 of the abutment 526 depresses the free end of the finger which encounters the abutment as the assembly of fingers is rotated.

Mounted on a bracket 537 just below the plane of each of the finger supporting discs 532 is an arcuate bar 538 having as the center of its arc the axis of shaft 533. The arc of bar 538 is slightly more than semi-circular, and the left-hand end of the arc as viewed in Fig. 15 is presented just beyond the point of interference of the abutments 526 with the fingers 531. The extent to which abutments 526 in marking position depress fingers 531 is sufficient to deflect the finger below bar 538 while those of the fingers 531 that are not depressed move in a plane above the bar 538. As fingers 531 comprising a vertically aligned set of fingers of the five discs 532 pass the abutments 526 they move into overlapping or underlapping relation to their respective bars 538 and are retained in those positions by the bars 538 as the fingers are advanced step by step to bring successive sets into cooperation with the abutments 526 of T-levers 523.

The assembly of discs 532 has associated therewith an escapement wheel 541 which is releasable for advancement a distance of one tooth by an escapement pawl (not shown) operable by the armature lever 542 of a magnet 543. Armature lever 542 is biased in clockwise direction by spring 544 for holding the escapement pawl in normal position. When magnet 543 is energized, armature lever 542 is rocked counterclockwise and the escapement pawl is rocked to release escapement wheel 541 which together with the assembly of disc 532 is rotated from shaft 533 by means of friction discs 534 until escapement wheel 541 is arrested by the check pawl portion of the escapement pawl, which may occur after the escapement wheel has rotated slightly less than one tooth distance of the escapement wheel. Upon the deenergization of magnet 543, spring 544 restored armature lever 542 and therefore the escapement pawl to normal position and the advancement of escapement wheel 541 through one tooth distance is completed. The distance through which fingers 531 travel for one cyclic operation of magnet 543 is sufficient to carry them past the abutments 526 of T levers 523 to be set in permutational combination of deflection and nondeflection thereby, and into cooperation with the arcuate bars 538 to be retained in those permutational combinations.

To the right of shaft 533 as viewed in Fig. 7 is a shaft 546 which carries a continuously driven gear 547. Shaft 546 has secured thereto a stop disc 548 which is normally held arrested by stop latch 549. Gear 547 imparts a continuous torque through the hub of disc 548 to shaft 546 by friction disc 551 held under compression by spring 552.

Shaft 546 has slidably keyed thereon a transmitting cam sleeve 553 which is rotatable from letf to right as viewed in Fig. 7 which, in Fig. 15, is counterclockwise. Transmitting sleeve 553 has spirally arranged around the periphery thereof a set of five transmitting cams 554 the leading edges of which are beveled. The sleeve also carries near the top a stop impulse cam 556, the leading edge of which is beveled. In the rest position of sleeve 553 the beveled leading face of stop signal cam 556 has passed a bracket 557 carried by a stationary plate 558, which may be an extension of the range scale plate of the receiving selector mechanism, and the upper flat surface of the stop signal cam 556 is resting against the lower face of bracket 557. The bracket 557 holds transmitting cam sleeve 553 in its lowermost position of sliding movement upon shaft 546, which is the full line position. Dotted lines indicate the extent to which sleeve 553, which is urged upwardly upon shaft 546 by compression spring 559, may rise.

A lever 561 which is biased in clockwise direction bears against the lower edge of transmitting cam sleeve 553 and controls a pair of contacts 562. When cam cylinder 553 is in its lowermost position, contacts 562 are held closed and when the cylinder rises, contacts 562 open. When stop latch 549 is withdrawn from engagement with stop disc 548 and transmitting cam cylinder 553 is released for rotation, it rises to its uppermost position as soon as stop signal transmitting cam 556 escapes from bracket 557. Thereafter, as the cylinder rotates, the transmitting cams 554 successively pass the free ends of their respective fingers 531 in the set presented toward transmitting cylinder 553 in a plane defined by the axis of shafts 533 and 546. As a cam projection 554 passes its associated finger 531 when the finger has not been depressed into position below the retaining bar 538, the cam projection passes under the lower surface of the finger without being affected by the finger and accordingly, axial movement of cylinder 553 downwardly does not occur. However, when one of the cam projections 554 passes a finger which has been depressed, the end of the finger is in the path of the beveled leading surface of the cam and thus the cam is shifted downwardly and with it, the cylinder 553, in order for the cam to pass by the end of the finger. Thus, when a cam projection passes an associated finger which is in spacing position, the cylinder 553 remains in its upper position, the contacts 562 are opened, and a spacing impulse is generated. When the cam projection 554 encounters a finger 531 in marking position, cylinder 553 is shifted downwardly and contacts 562 are closed and a marking impulse is generated.

The stop latch 549 for transmitting cam cylinder 553 is operated by a magnet 563 which has one end of its winding connected to grounded battery 564 and the other end of its winding connected to contact 566. A contact 567 which is movable into engagement with contact 566 is connected by conductor 568 to the contact tongue of a relay 569. A pin 571 carried on the lower face of escapement wheel 541 holds contact 567 out of engagement with contact 566 in the normal position. Escapement wheel 541 is advanced as signals are received in the receiving selector mechanism and are stored in the sets of fingers 531 shortly after the escapement wheel starts, the pin 571 moves out of restraining relation to contact 567 which moves into engagement with contact 566, thus preparing an energizing circuit for the start magnet 563. The contact tongue of relay 569 cooperates with a grounded front contact for completing the energizing circuit of start magnet 563 and the relay 569 becomes energized through the contacts 562 as will be described later.

Magnet 543 for controlling the operation of escapement wheel 541 is energizable from either of two sources. The receiving selector cam assembly 502, in addition to the receiving cam projections 514 is also provided with a sixth cam projection which is customarily employed to set in operation the recording apparatus that is to be controlled by the signals received in the selector mechanism. The sixth cam projection usually affects its control about the time that the fifth receiving cam projection has operated its sword lever. In accordance with the present invention, a lever 572 is provided in association with the receiving selector cam assembly 502 to be operated by the sixth cam projection. When cam follower lever 572 is operated, it closes contacts 573, which are normally open, to connect ground through the contacts 573, conductor 574, winding of escapement operating magnet 543 to grounded battery 576. Thus, just before the end of each code receiving cycle of selector cam assembly 502, contacts 573 are closed and escapement controlling magnet 543 is operated to permit the assembly of discs 532 to be rotated one step so that a set of fingers 531 may be set in accordance with the code combination received.

An energizing circuit for escapement controlling magnet 543 may also be completed from grounded battery 576 through winding of magnet 543, conductor 577, and normally open contacts 578. The disc 548 associated with transmitting cam cylinder 553 is provided with a pin 581 which closes contacts 578 once in each revolution of cylinder 553. Preferably the contacts 578 are closed during the start and stop impulses between the transmission of two code combinations. In this way, the transmitting cylinder 553 controls the advancement of the set of fingers 531 to the signal transmitting position by closing the circuit of escapement controlling magnet 543.

Referring now to the upper part of Fig. 7, the sequence switch 33 performs the same functions as the sequence 31 (Fig. 5). Differences in the operation and control of a mechanical register of telegraph signals such as the register 34, as compared with the magnetic register 32, necessitate certain different connections in the sequence switch 33 through which the mechanical register 34 is controlled and operated. Since the starting and stopping of the receiving selector mechanism and the evidencing of signals is accomplished by a single magnet 508, it is possible to control the storing register through a single contact bank and brush and accordingly, the sequence switch 33 is provided with six banks of contacts and six brushes and these correspond to the second, third, fourth, fifth, sixth, and seventh banks of contacts and brushes in the sequence switch 31. In general, the connections to the contact in the first, third, fourth, fifth, and sixth banks are substantially identical with those of the second, fourth, fifth, sixth, and seventh banks respectively of sequence switch 31. The connections to the contacts of the second bank of sequence switch 33 differ considerably with those of the third bank of contacts in sequence switch 31 because of fundamental differences in the two types of signal storing registers that are operated through the respective banks of contacts.

In the first bank of contacts, with which the brush 581 cooperates, the first contact is dead, the second and third contacts are connected to conductor 322 over which stepping impulses are received from transmitting distributor 27, the fourth, fifth, and seventh contacts are connected to conductor 341 over which stepping impulses are transmitted from the master time transmitter, the sixth segment is connected to conductor 424 over which a stepping impulse is transmitted from the master time transmitter by way of the contact tongue of relay 426 which becomes effective when the release key is operated at the subscriber's station, the eighth and ninth contacts are dead, the tenth and eleventh contacts are connected to conductor 486 over which stepping impulses are transmitted from the motor stop signal transmitter, and the remaining contacts of the bank are dead. Brush 581 is connected to the winding of stepping magnet 283.

In the second bank of contacts, which is engaged by brush 582, the second and third contacts are connected to conductor 323 over which line identification signals are transmitted from the rectifier and repeater controlled by transmitting distributor 27, the fifth and seventh contacts are connected to conductor 403 over which time signals are transmitted, and all of the remaining contacts are connected to ground. Brush 582 is connected by conductor 589 to grounded winding of relay 588 which has a back contact connected to grounded battery 585 and a contact tongue connected to selector magnet 508 of the receiving selector mechanism associated with the mechanical signal storing device. The relay 588 receives permutation code signals from the second, third, fifth, and seventh contacts of the contact bank in the form of current for spacing and no-current for marking, and controls magnet 508.

In the third bank of contacts, with which brush 583 cooperates, all of the contacts in the bank are dead except the ninth to which conductor 458 is connected. Conductor 458 is the line over which signals stored in the storing device are retransmitted to the selector magnet 578 (Fig. 9) of the recording printer for accounting data at the central office.

In the fourth bank of contacts, with which brush 584 cooperates, the first, eighth, and ninth contacts are connected to conductor 312 which is the conductor over which stepping impulses for the stepping magnet 283 are transmitted when it is desired to include the interrupter contact tongue 284 of the stepping magnet 283 in the energizing circuit, the second and third contacts are connected together and to conductor 326 which extends to one side of the source of alternating current 228 which supplies alternating current for generating the line identification signals, contacts 5, 7 and 11 are connected to conductor 421 over which time signals and the motor stop signal may be transmitted to the subscriber's stations 21 and 24, and the remaining contacts of the bank are dead.

In the fifth contact bank, which is the bank engaged by brush 586, the first contact is connected to conductor 314 which extends to the left-hand contact tongue of relay 316 over which ground is supplied for the first stepping of the sequence switches from normal position, the second contact is connected to conductor 327 over which the circuit of the primary winding of transformer 163 for supplying alternating current to generate the line identification signal for subscriber's station 24 is completed, the third contact is connected to conductor 337 over which the circuit for the primary winding of transformer 227 which supplies alternating current for generating the line identification signal of the subscriber's station 21 is completed, the fifth and seventh contacts are connected together and to conductor 414 over which time signals are transmitted from the master time transmitter, the eighth contact is connected to conductor 431 over which current for operating stepping magnet 283 is supplied under the control of relay 432, the ninth contact is connected to conductor 474 over which current for operating the stepping magnet 283 is supplied under the control of relays 466 and 469 (Fig. 9), the eleventh contact is connected to conductor 494 over which motor stop signals are received from the motor stop signal transmitter, and the remaining contacts of the bank are dead. Brushes 584 and 586 associated with the fourth and fifth banks of contacts, respectively, are connected together so that the two brushes complete single circuits.

In the sixth bank of contacts, with which grounded contact tongue 587 cooperates, the second contact is connected to conductor 328 over which current is supplied to control the transmission of a line identification signal to the subscriber's station 21 only, the third contact is connected to conductor 338 over which current is supplied to control the transmission of a line identification signal to the subscriber's station 24 only, the fourth contact is connected to conductor 349 over which current is supplied to relay 201 for releasing the line identifier mechanism following the recording and the transmission to the subscriber's station of the line identification signals, the eighth and ninth contacts are connected to conductor 433 over which current for operating relays 434 to select an accounting data printing recorder is supplied, the contacts from 12 to the end of the bank are connected together and to conductor 312, and the contacts 5, 6, 7, 10, and 11 are dead.

In the following description of the operation of the system when the line identification and time signals are to be stored in the mechanical signal storing device shown in Fig. 7, the description will be general as to all apparatus except the signal storing device, and conductive circuits heretofore traced in detail will not be retraced.

Upon the operation of relay 206 (Fig. 2) following the establishment of a communicative channel between two subscribers' stations, the stepping magnet 266 of the link circuit finder switch 29 will be energized over its interrupter contact tongue circuit and will be stepped until it finds an interrupter contact tongue shunting energizing circuit for the stepping magnet 266, whereupon the brushes will come to rest, it being assumed as before that they stop in engagement with their sixth contacts. The brushes of sequence switch 33 are stepped to their second bank contacts where they remain while transmitting distributor 27 operates through one cycle to transmit signals representing the identification of the called subscriber. The brushes 584 and 586 of sequence switch 33 determine that alternating current shall be applied to the single conductor which will generate signals corresponding to the identification of the called subscriber and the brush 587 determines that the line identification signals shall in this cycle of operation of distributor 27 be transmitted only to subscriber's station 21 of the two interconnected subscribers' stations. The generated direct current signals representing the identity of the called subscriber's station are transmitted over conductor 323 through brush 582 of sequence switch 33 and over conductor 589 to relay 588 which controls the selector magnet 508 which in turn controls the setting of T-levers 583 in successive combinational positions corresponding to the line identification signals. At the end of each signal combination, the lever 572 (Fig. 7) closes contacts 573 to operate escapement controlling magnet 543 to permit a set of signal storing fingers 531 to be stepped past the ends of the T-levers 523 whereby the fingers will be set according to the signal combination and will be retained in the set combinations by the arcuate bars 538.

At the end of the first cycle of distributor 27, the stepping magnet for the sequence switch 33 is operated over a circuit completed through the segments 243 and 244 of the distributor 27 and the brushes are stepped to their third contacts. The only circuit changes that occur are in the fifth and sixth bank of contacts. In the fifth bank, the closed secondary circuit condition is transferred to the transformer which supplies alternating current for energizing the single conductor for coding the identification of the calling subscriber's station. In the sixth contact bank, a transmission circuit change is made so that the line identification signals for the calling subscriber's line shall be transmitted only to the called subscriber's station 24. During the second cycle of operation of the transmitting distributor 27, the signals representing the identity of the calling subscriber's station are transmitted to the receiving selector magnet 508 and are stored in sets of fingers 531. It should be noted at this point that as the escapement wheel 541 (Fig. 7) advances, the pin 571 is moved out of cooperation with contacts 567 and the contacts close, thus preparing a circuit for the energization of start magnet 563 of the signal retransmitting cylinders 553.

At the end of the second cycle of transmitting distributor 27, the brushes of sequence switch 33 are stepped to the fourth contacts in the contact banks. In this position, battery is applied to the winding of selector magnet 508 from relay 588 to hold the receiving selector mechanism in rest condition, the relay 201 is operated to effect the release of relay 206 and thus the release of line identifying mechanism 26, transmitting distributor 27, rectifier and repeater 28, and finder switch 29 so that all of that mechanism which is shown in Fig. 4 will be free to become associated with another subscriber interconnecting link circuit. In this position of the brushes, a circuit is prepared for the energization of stepping magnet 283 over the conductor 341 extending to the first bank of contacts in the sequence switch 33 for energization of the stepping magnet under the control of impulsing cam 416 of the master time transmitter (Fig. 11). When the cam 416 operates contacts 342, the sequence switch brushes are stepped to the fifth contacts.

No change occurs in the circuit connections in the first bank of contacts. In the second bank of contacts, the conductor 403 over which the master time transmitter supplies time signals becomes connected to brush 582 and conductor 589 to relay 588 of the signal storing register 34. In the fifth and sixth banks of contacts and their associated brushes 584 and 586, a time signal transmission circuit is completed over conductors 414 and 421 for the transmission of time signals to the subscriber's stations. While the brushes remain in engagement with the fifth contacts, the master time transmitter transmits signals representing instant time which are stored in the sets of fingers 531 and are transmitted to the subscriber's stations 21 and 24. At the conclusion of the transmission of the time signals, the cam 416 again operates contact 342 to energize stepping magnet 283 and advance the sequence switch brushes to their sixth bank of contacts. In the sixth contact position of sequence switch 33 an energizing circuit for stepping magnet 283 is prepared which at this time is open at the contact tongue of slow release relay 426. This relay has not yet become energized and does not become energized until the conclusion of message transmission between the subscribers and until the operation of the release key 48 at the subscriber's station 21. The sixth contact of the second bank of contacts is dead, so that relay 588 is deenergized to hold selector magnet 508 energized and thus hold the receiving selector mechanism of the signal storing register 34 in rest condition.

At the conclusion of message transmission and upon the operation of release key 48, relay 426 becomes energized and attracts its contact tongue to complete the energizing circuit for stepping magnet 283 and the brushes 581 to 587, inclusive, are stepped to their seventh contacts. The stepping does not occur immediately upon the attraction by relay 426 of its contact tongue as the circuit thus prepared is under the control of contacts 342 of the master time transmitter operable by cam 416. Upon the operation of contacts 342 the brushes are stepped to their seventh contacts. At the seventh contacts the circuits through the sequence switch 533 are identical with those which were completed through the fifth contacts, and from this it will be apparent that the receiving selector mechanism of signal storing register 34 is operated to store the signals representing the time of operation of the release key 48 and the signals will be transmitted to the subscribers' stations. After the signals have been transmitted, the cam 416 again operates contacts 342 to step the sequence switch brushes 581 to 587 to engagement with the eighth contacts of sequence switch 33.

At the eighth contact in the first bank of contacts, no circuit is completed. In the second bank of contacts, the circuit of relay 588 is open, and as all remaining contacts of the second bank are dead, the relay 588 will not be again energizer and selector magnet 508 will remain energized during the remainder of the cycle of the sequence switch. The reason for this is that no further signals are to be stored in the signal storing register during this cycle of operation of the sequence switch brushes and therefore the selector magnet will be held energized so that the receiving cam assembly 502 will not be operated and the escapement mechanism will not be operated under the control of local impulse contacts 573.

At the fourth and fifth contact banks, a circuit will be prepared for the energization of the stepping magnet 283 from the contact tongue and front contact of relay 432, but at this time, the relay 432 is deenergized. At the eighth contact in the sixth bank of contacts, the circuit is completed for the energization of relay 434 which becomes energized and attracts its contact tongues to set in operation the stepping mechanism for the brushes of sequence switch 439 (Fig. 9) and to prepare a circuit for the energization of relay 432. The brushes of sequence switch 439 are advanced by their stepping magnet 444 under the control of its interrupter contact tongue until the brushes encounter a shunting circuit for the interrupter circuit of the stepping magnet 444 through relay 432. The brushes of sequence switch 439 advance no further and the relay 432, becoming energized in series with the stepping magnet 444, completes the energizing circuit for stepping magnet 283 of sequence switch 33 which steps the brushes to the ninth contacts of the contact banks.

In the first bank of contacts, the ninth contact is dead. In the third bank of contacts, a circuit is completed for the first time in the operation of the sequence switch from ground at relay 569 of the signal storing register through the winding of relay 569, closed transmitting contacts 562, conductor 591, brush 583 of sequence switch 33, conductor 4580, fourth contact of the third bank of contacts in sequence switch 439, brush 451, conductor 459, winding of relay 461 to grounded battery 462. This circuit is a signal transmission circuit and relay 461 operates to connect selector magnet 478 of the recording printer to this communication circuit. Relay 569 thus becomes energized and attracts its contact tongue into engagement with its grounded front contact, completing an energizing circuit for start magnet 563 of retransmitting cam sleeve 553 from ground through the contact tongue of relay 569, conductor 518, contacts 566 and 567 now closed, winding of start magnet 563 to grounded battery 564. Magnet 563 becomes energized and attracts stop arm 549 out of engagement with disc 579, whereby transmitting cylinder 553 is released for rotation. When sleeve 553 has rotated sufficiently for lug 556 to escape from bracket 557, the sleeve is shifted upwardly on shaft 546 by spring 559 which permits contacts 562 to open, thus generating a start pulse which is transmitted to selector magnet 478 of the receiving printer (Fig. 9) and starts the receiving selector mechanism of that printer.

As sleeve 553 rotates, it is moved downwardly on shaft 546 by any of the successive cams 554 which encounter fingers 531 that are deflected into marking position, and under those circumstances, contacts 562 are closed. Fingers 531 which are in their upper or spacing positions permit their associated cams 554 to pass without moving sleeve 553 downwardly upon shaft 546 and contacts 562 remain open. Thus, the sleeve 553 is oscillated to generate signals corresponding to those stored in the first set of fingers 531. At the end of the signal combination, cam 556 encounters bracket 557 and shifts sleeve 553 downwardly to transmit the stop impulse. Also about this time, pin 581 carried by disc 579 operates contacts 578 to energize stepping magnet 543 for the assembly of storing finger discs 532 and thus the next set of fingers is advanced into position to cooperate with the cams 554 of transmitting sleeve 553. This operation continues until all of the signals stored in the sets of fingers 531 have been transmitted. It will be understood that there will be enough sets of fingers 531, arranged in an angle of slightly less than 180° about shaft 533, to accommodate all of the code combinations involved in two line identifications and two indications of time. The reason for the spread of fingers 531 being slightly less than 180° is that the first set of fingers shall not have reached the point of cooperation with the T-levers when the last set is in signal transmitting position, and that the first set shall not have passed the transmitting position when a signal has been stored in the last set.

With the last set of fingers 31 in transmitting position, escapement wheel 541 has returned to the position where its pin 571 opens contacts 566 and 567. The energizing circuit of start magnet 563 is thus interrupted and at the conclusion of the transmission of the signal combination, the transmitting cam sleeve 553 will come to rest. In the rest position, contacts 562 are closed as previously described so that relay 461 (Fig. 9) remains energized following the arrestment of transmitting cam sleeve 553. This is the same condition as that described in connection with the conclusion of retransmission from the stored signals from the magnetic storing register, and after a predetermined interval, slow-to-release relay 469 releases its contact tongue 467, thus completing an energizing circuit for the stepping magnet 283 of sequence switch 33 through the brush 449 and second bank of contacts in sequence switch 439 and through the brushes 584 and 586 in the sequence switch 33 to conductor 312. The brushes of sequence switch 33 are thus advanced into engagement with their tenth contacts.

In the first bank of contacts, a circuit is prepared for the energization of stepping magnet 283 from the impulsing contacts 487 of motor stop signal transmitter 494 (Fig. 12). Start magnet 508 of mechanical storing register 34 continues to be held from relay 588, and the tenth contacts of the remaining banks of contacts are dead so that no circuits are completed through them.

When cam 489 closes contacts 487, which it does once per revolution, stepping magnet 283 is energized and the sequence switch brushes 581 to 587, inclusive, are stepped to their eleventh contacts. In the first bank of contacts, the eleventh contact is connected to the tenth and thus to conductor 486 so that a circuit is again prepared for the energization of stepping magnet 283 from cam controlled contacts 487. No change occurs at the second and third banks of contacts nor at the last bank of contacts. At the fourth bank of contacts, the eleventh contact is connected to conductor 421 over which the motor stop signal impulses will be transmitted to operate relay 137 and cause it to repeat the motor stop signal. In the fifth bank of contacts, the eleventh contact is connected to conductor 494 which extends to the transmitting contacts 493 of the motor stop signal transmitter. As transmitting cam 491 rotates, it will oscillate contacts 492 as previously described and motor stop signals will be transmitted to the subscribers' stations 21 and 24 to effect the release of connections between the link circuit and the subscribers' stations at the line finders 112 and 147 and the restoration of the apparatus at the subscribers' stations and at the central office to normal condition.

Following the completion of transmission of the motor stop signals, cam 489 again closes contacts 487, thus completing the circuit of stepping magnet 283 which steps the brushes 581 to 587 to the twelfth position. No circuits are prepared or completed through the twelfth contacts of any except the sixth contact bank. In the sixth contact banks, the twelfth contact and all remaining contacts are connected together and to conductor 312 so that an energizing circuit will be completed for the stepping magnet 283 from the ground at brush 587 through the brush, through conductor 312, the interrupter contact tongue 284 of sequence switch 283, the winding of the sequence switch to battery 286. As in the case of the sequence switch 31 this establishes a homing circuit for advancing the brushes step by step as rapidly as the stepping magnet 283 can become energized, and deenergized. When the brushes have returned to normal position, they will come to rest because the energizing circuit of stepping magnet 283 will be open due to the fact that the first contact of the sixth bank of contacts of sequence switch 33 is dead and the starting circuit through conductor 312, conductor 313, brushes 584 and 586, and conductor 314 will be open at the left-hand contact tongue of relay 316.

As previously described, the sequence switch 439 (Fig. 9) has no homing circuit and therefore the brushes remain in the position where they were last used until another of the sequence switches 33 in the central office sets the stepping magnet 444 in operation to bring the selector magnet 478 of the recording printer into cooperation with such other sequence switch 33.

Although specific embodiments of the invention have been shown in the drawings and described in the foregoing specification, it is to be understood that the invention is not limited to such specific embodiments but is capable of modification, rearrangement, and substitution of the parts and elements without departing from the spirit of the invention and within the scope of the appended claims.

What is claimed is:

1. In a communication system, a plurality of subscribers' stations, a central office station, means at the central office station for interconnecting any two of said subscribers' stations, means for generating recordable code signals representing the identification of the interconnected subscribers' stations, means for generating code signals representative of instant time, a single means for storing both said station identification signals and said time signals, means for producing a printed record corresponding to said code signals, and means for retransmitting the signals stored in said storing means to said record producing means.

2. In a communication system, a plurality of subscribers' stations, a central office station, means at the central office station for interconnecting any two of said subscribers' stations, means for generating permutation code signals representing the identification of the interconnected subscribers' stations, means for generating code signals representative of instant time, means for storing said station identification signals and said time signals upon a single storage element, means for transmitting to each of the interconnected subscribers' stations the code signals representing the identity of the station to which it is connected, means for producing a printed record corresponding to the code signals stored on said element, and means for retransmitting the signals stored in said storing means to said record producing means.

3. In a communication system, a plurality of subscribers' stations, a central office station, means at the central office station for interconnecting any two of said subscribers' stations, means for generating code signals representing the identification of the interconnected subscribers' stations including a classification symbol, means for generating code signals representative of instant time, a magnetic apparatus for storing said station identification signals and said time signals, means for eliminating from storage the code signal representing the classification symbol of the called subscriber's station, means for producing a printed record corresponding to code signals, and means for retransmitting the signals stored in said magnetic apparatus to said record producing means.

4. In a communication system, a plurality of subscribers' stations, a central office station, means at the central office station for interconnecting any two of said subscribers' stations, means including a distributor and conditioning elements therefor characteristically associated with the line from each of said subscribers' stations for generating code signals representing the identification of the interconnected subscribers' stations including a classification symbol, magnetic means for generating code signals representative of instant time, means for storing said station identification signals and said time signals, means for transmitting to each of the interconnected subscribers' stations the code signals representing the identity of the station to which it is connected, means for omitting the storage in the storing means and the transmission to the calling subscriber's station of the code signal representing the classification symbol of the called subscribers' station, means for producing a printed record corresponding to code signals, and means for retransmitting the signals stored in said storing means to said record producing means.

5. In a communication system, a plurality of subscribers' stations, a central office station, a plurality of link circuit systems at the central office station individually available for connecting any calling subscriber's station to any called subscriber's station, a code signal storing register individual to each link circuit system, rotary means common to a plurality of said link circuit systems for generating and transmitting code signals representing the identification of interconnected subscribers' stations, means associated with said signal generating and transmitting means for connecting said signal generating and transmitting means to said signal storing means and to said interconnected subscribers' stations, and means associated with said link circuit system for releasing said connecting means following transmission of said code signals.

6. In a communication system, a plurality of subscribers' stations, a central office station, a plurality of link circuit systems at the central office station individually available for connecting any calling subscriber's station to any called subscriber's station, a code signal storing register individual to each link circuit system, means common to a plurality of said link circuit systems for generating and transmitting code signals representing the identification of interconnected subscribers' stations, means common to a plurality of said link circuit systems for generating and transmitting code signals representing instant time, means associated with said signal generating and transmitting means for connecting said signal generating and transmitting means to said signal storing means and to said interconnected subscribers' stations, and means associated with said link circuit system and controlled by said code signal transmitting means for releasing said connecting means following transmission of said code signals.

7. In a communication system, a plurality of subscribers' stations, a central office station, a plurality of link circuit systems at the central office station individually available for connecting any calling subscriber's station to any called subscriber's station, a code signal storing register individual to each link circuit system, means common to a plurality of said link circuit systems and adapted to be associated individually with said signal storing registers for generating and transmitting code signals representing the identification of interconnected subscribers' stations, and means common to a plurality of said link circuit systems and adapted to be associated with one or with a plurality of said registers simultaneously for generating code signals representing instant time.

8. In a communication system, a plurality of subscribers' lines, a signal impulse generator comprising, a series of transformers having primary windings permutationally connected in characteristic manner with various ones of a plurality of subscribers' lines so as to be affected by alternating current over said lines, secondaries of said transformers all connected to corresponding segments of a signal generating distributor, and means responsive to the establishment of communication over one of said subscribers' lines for extending current over the primaries of certain ones of said transformers so as to condition characteristically the related segments of said distributor.

9. In a communication system, a signaling impulse generator comprising a transformer including a closed magnetic circuit core, a secondary winding for said core, an electromagnetic shield member surrounding said core and said secondary winding and having apertures at the opposite sides thereof, a plurality of conductors associated with said transformer, certain of which extend through said shield member and thereby have a portion in inductive relation to said core and said secondary winding to serve as primaries for said transformer and others of which extend past said shield member exteriorly thereof to have no inductive influence upon said transformer, and means for impressing alternating current on said conductors individually to induce signaling current in said secondary winding by said certain of said conductors.

10. In a communication system, a signaling impulse generator comprising a plurality of transformers each including a magnetic core, a secondary winding supported by said core, and an electromagnetic shield member surrounding each of said cores and said secondary windings and having apertures at the opposite sides thereof, a plurality of conductors associated with said transformers, each of which extends through certain of said shields and thereby has portions in inductive relation to transformer core and secondary winding contained in said certain shield members to serve as primaries for said transformers, and each of which extends past others of said shield members exteriorly thereof to have no inductive influence upon the transformers contained in said other shield members, and means for impressing alternating current on said conductors individually to induce signaling current in the secondary windings of the transformers which have the conductors in inductive relation.

11. In a communication system, a signaling impulse generator comprising a plurality of uniform sets of transformers, each transformer including a magnetic core member, a secondary winding for said core member, and an electromagnetic shield member surrounding said core and said secondary winding and having apertures at the opposite sides thereof, a plurality of single conductors individually extending through the shield members by means of said apertures or exteriorly of the shield members of each set of transformers and of all of the sets of transformers in permutation code manner to serve as primaries for the transformers through the shield members of which they extend, and means for impressing alternating current on said conductors individually to generate in the secondary windings of each set of transformers permutation code combinations of signaling current.

12. In a communication system, a plurality of subscribers' stations, a central office station, means at said central office station for interconnecting any two of said subscribers' stations, means for generating permutation code signals representing the identification of the interconnected subscribers' stations, means for generating code signals representative of instant time, means for storing said identification signals and said time signals instantly that they are generated upon a single recording apparatus, means for transmitting to each of the interconnected subscribers' stations the code signals representing the identity of the station to which it is connected, means for transmitting to both subscribers' stations the signals representing instant time, means at the central office for producing a printed record corresponding to code signals, and means for retransmitting the signals stored in said recording apparatus to said record producing means.

13. In a telegraph transmitter, a plurality of transformers, one corresponding to each element of a code, a plurality of circuits to each of which an individual code signal is assigned, a conductor associated with each of the circuits which passes through the magnetic core of transformers corresponding to elements of the signal which have one characteristic and which passes outside the magnetic core of those transformers which correspond to elements of the code having another characteristic, and means to generate complete code signals under control of the secondaries of the transformers.

14. In a communication system, a plurality of subscribers' stations, a central station, a plurality of link circuits at the central station to connect any subscriber's station to any other subscriber's station, and means included in the link circuit and effective after a link circuit has established a connection between two particular subscribers' stations to generate a code signal individual to a connected subscriber's station.

15. In an exchange system, a plurality of subscribers' stations, a central station, a switching system at the central station, link circuits included in the switching system for connecting any two of the subscribers' stations, a master transmitter adapted to generate permutational code signals individually identified with each subscriber's station, means to connect two particular subscribers' stations to one of the link circuits, means at the central station common to all of said subscribers' stations permanently associated with an individual subscriber's station to determine the code corresponding to that station, and means forming a part of the link circuit to determine the signaling characteristics of the code signals.

16. In an exchange system, a plurality of substations, a central station, link circuits at the central station to connect any two substations for communication, means to apply alternating current through a link circuit to a circuit permanently associated with a connected substation, and means to generate under the control of the alternating current a code signal identifying the connected circuit.

17. In an exchange system, a plurality of substations, a central station, link circuits at the central station to connect any two substations for communication, means to apply alternating current through a link circuit to a circuit permanently associated with a connected substation, means to generate from the alternating current a code signal individual to the connected circuit, and means to impress the generated signal on a storage element of the link circuit.

18. In an exchange system, a plurality of subscribers' circuits, a central station, means at the central station including a link circuit to connect any two subscribers' circuits for communication, means associated with each one of said link circuits to generate individual signals identifying each subscriber's circuit, and means associated with each subscriber's circuit to determine the signal to be transmitted.

19. In a communication system, a plurality of communication circuits, an auxiliary circuit permanently associated with each communication circuit, means to apply an alternating electromotive force to any one of said auxiliary circuits when the associated communication circuit is seized for use, and means to generate a signal individual to said seized circuit in response to the application of said electromotive force.

20. In a signaling system, a plurality of transformers each including a magnetic core forming a substantially closed magnetic path, a secondary winding in each core, a plurality of single conductors extending through some of the closed magnetic paths and extending outside of other closed magnetic paths in various permutations different for each conductor, a circuit associated with the secondary windings, means to impress an alternating electromotive force on any one of the conductors, and thereby generate permutation code signals in the circuit associated with the secondary windings.

21. In a communication system, a signal generating transmitter including an element having a number of consecutive segments in correspondence with the component impulses of a predetermined series of signals, a plurality of transformers with secondaries individually associated with said segments, and means for associating a plurality of incoming lines with primaries of said transformers to condition said segments for each of said lines in an individual and characteristic manner.

22. In a communication system, a series of transformers, means for including primary currents permutationally among said series of transformers and means for generating a signal comprised of impulses originating from the secondaries of said transformers for thereby characterizing the particular incoming line through its manner of traversing said transformers.

23. In a communication system, a series of induction windings, a signal generating mechanism for creating permutation code signals in accordance with secondary currents induced in said windings, and means for variably associating a plurality of individual lines so as to permutationally affect the primaries of said windings for thereby establishing the signal codes for identifying said lines.

LOUIS M. POTTS.